United States Patent [19]

Kamabora et al.

[11] Patent Number: 5,522,254
[45] Date of Patent: Jun. 4, 1996

[54] KNOCK SENSING APPARATUS FOR INTERNAL COMBUSTION ENGINE

[75] Inventors: Koichi Kamabora, Tokoname; Koji Sakakibara, Hekinan; Kazuhiro Nakai, Kariya; Hirohiko Yamada, Anjo; Hideaki Ishihara, Okazaki; Haruyasu Sakishita, Toyohashi, all of Japan

[73] Assignee: Nippondenso Co., Ltd., Kariya, Japan

[21] Appl. No.: 349,000

[22] Filed: Nov. 29, 1994

Related U.S. Application Data

[63] Continuation-in-part of Ser. No. 160,884, Dec. 3, 1993, abandoned.

[30]     Foreign Application Priority Data

Dec. 4, 1992  [JP]  Japan ..................... 4-325514
Aug. 17, 1993 [JP]  Japan ..................... 5-203173
Dec. 1, 1993  [JP]  Japan ..................... 5-301478

[51] Int. Cl.$^6$ ................................................. G01L 23/22
[52] U.S. Cl. ............................. 73/35.05; 73/117.3
[58] Field of Search ............................ 73/35, 119 R, 73/117.3; 364/431.08

[56]                References Cited

U.S. PATENT DOCUMENTS 4,345,558  8/1982  Yamaguchi et al. .
4,418,567  12/1983 Boning et al. .
4,483,180  11/1984 Ohbuchi et al. ................. 73/35
4,499,877  2/1985  Iwata .
4,599,982  7/1986  Sugiura .
4,750,103  6/1988  Abo et al. .
5,119,783  6/1992  Komurasaki ................. 73/117.3
5,373,448  12/1994 Katogi et al. .
5,408,863  4/1995  Sawyers et al. ................. 73/35

FOREIGN PATENT DOCUMENTS 56-66712   6/1981  Japan .
61-215942  9/1986  Japan .

Primary Examiner—Richard Chilcot
Assistant Examiner—Max Noori
Attorney, Agent, or Firm—Cushman, Darby & Cushman

[57]                    ABSTRACT

A knock sensing apparatus for an internal combustion engine which can detect a failure in a knock sensor signal system correctly even when a changeover operation due to hardware is performed at a place between a knock sensor and a band pass filter. In this knock sensing apparatus, the failure detection by a failure detecting circuit for detecting a failure in a signal system from knock sensors is invalidated for a predetermined period after one of the knock sensors has been changed over to the other knock sensor, or one of two kinds of pass bands of a band pass filter has been changed over to the other pass band, to prevent a decrease in failure detection accuracy due to the signal delaying action of the switched capacitor filter.

30 Claims, 22 Drawing Sheets

KNOCK SENSING APPARATUS FOR INTERNAL COMBUSTION ENGINE

CROSS-REFERENCE TO RELATED APPLICATION

The present application is a Continuation-In-Part of U.S. patent application Ser. No. 08/160,884 filed on Dec. 3, 1993, now abandoned. The disclosure of that application is incorporated herein by reference.

BACKGROUND OF THE INVENTION

1. Field of the Invention

The present invention relates to a knock sensing apparatus used in a knock control system for an internal combustion engine, and more particularly to a knock sensing apparatus capable of detecting a failure therein.

2. Description of the Related Art

A method of detecting a failure in a knock sensing apparatus for an internal combustion engine is disclosed in Japanese patent application JP-A-56-66,712. In this method, a knock detecting period and a failure detecting period are separated from each other, and a failure in the knock sensing apparatus is judged on the basis of whether the output of the knock sensor in the knock sensing period is high or low. Further, another Japanese patent application JP-A-61-215,942 discloses a knock sensing apparatus for an internal combustion engine, in which a plurality of knock sensor signals (that is, output signals of a plurality of knock sensors) are successively selected by a multiplexer, and the selected knock sensor signal is applied to a band pass filter.

Even in a case where one of the knock sensors is defective, the output signal of another knock sensor passes through the band pass filter, and thus the output of the band pass filter is not reduced to zero for a predetermined time $t$, as shown in FIG. 1. That is, in spite of the fact that one knock sensor is defective, the output of another knock sensor is delivered in the failure detecting period of the former knock sensor, and thus the failure in the former knock sensor cannot be detected.

Further, in a case where the pass band of the band pass filter is changed when one of cylinders is selected or when engine conditions are greatly altered, there arises a problem owing to the delay of the signal generated immediately after the change of the pass band and noise caused by the change of the pass band, such that it becomes impossible to detect the knock sensor failure correctly.

SUMMARY OF THE INVENTION

It is an object of the present invention to provide a knock sensing apparatus for an internal combustion engine which can detect a failure in a knock sensor signal system correctly, even in a case where a hardware changeover operation is performed at a place between a band pass filter and a knock sensor.

In order to attain the above object, according to the present invention, there is provided a knock sensing apparatus for an internal combustion engine which includes a knock sensor for detecting the vibration in an internal combustion engine, a band pass filter applied with the output signal of the knock sensor for transmitting a signal with a predetermined frequency band peculiar to a knock, changeover means interposed between the knock sensor and the band pass filter for performing a changeover operation due to hardware, knock detecting means for detecting a knock on the basis of the output signal of the band pass filter, failure detecting means for detecting a failure in a knock sensor signal system on the basis of the output signal of the band pass filter, and failure detection invalidating means for invalidating the detection of the failure for a predetermined period after the changeover means has performed the changeover operation.

When the vibration generated in the internal combustion engine is detected by the knock sensor, the output signal thereof is sent to the band pass filter. The changeover means carries out either a changeover operation due to hardware at a place between the knock sensor and the band pass filter, or a changeover in filtering characteristics of the band pass filter. Although the failure detecting means detects the failure on the basis of the output of the band pass filter obtained after the changeover operation has been performed, the detection of the failure is invalidated by the failure detection invalidating means for a predetermined period after the changeover processing has been carried out.

DESCRIPTION OF THE PREFERRED EMBODIMENTS

The first embodiment of a knock sensing apparatus according to the present invention will be explained below, with reference to the drawings.

Figure 1:
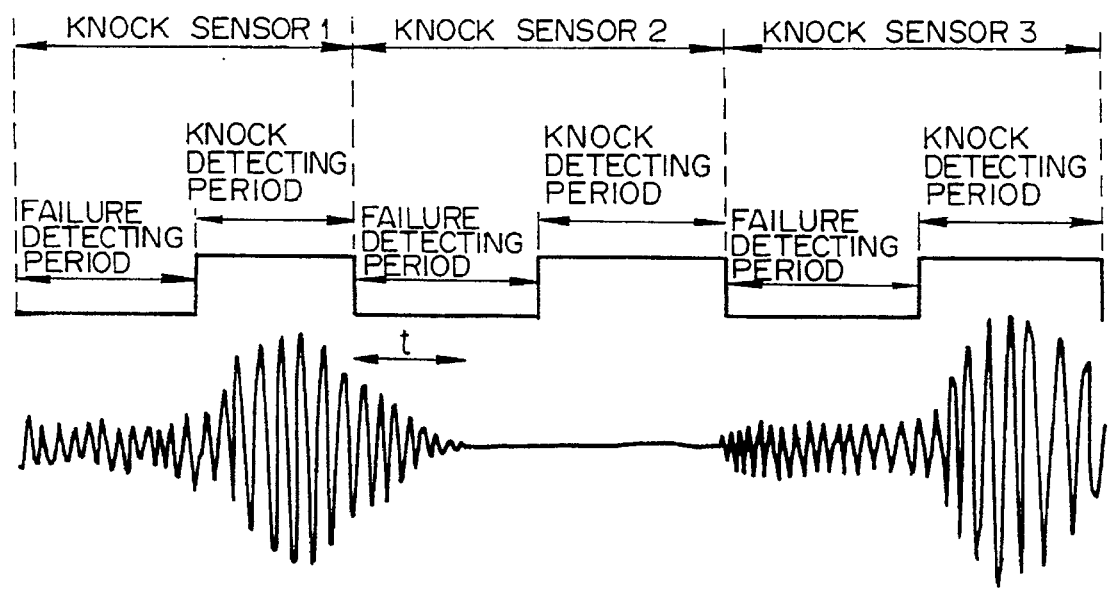
FIG. 1 is a time chart for explaining an operation of a prior art system.
Figure 2:
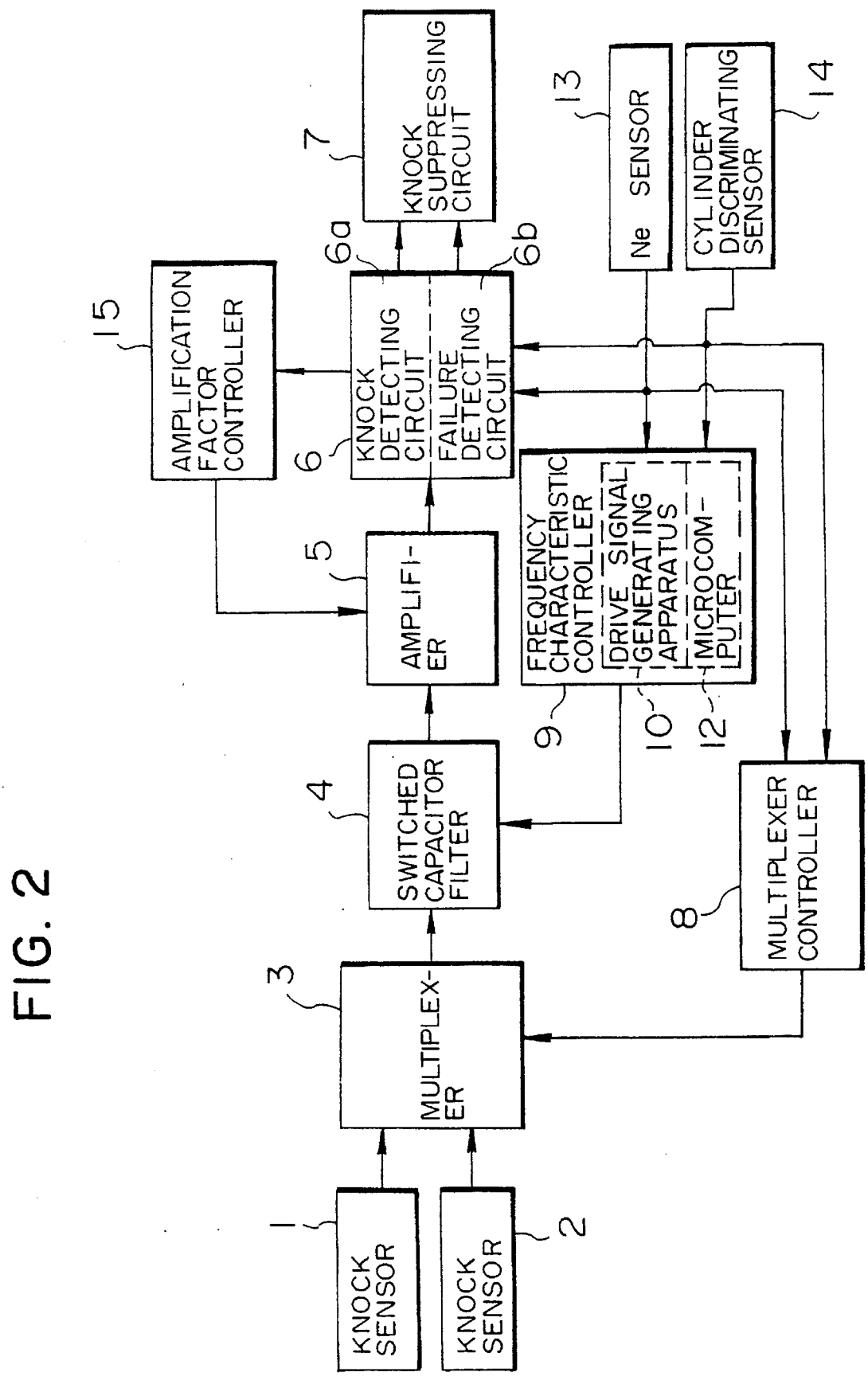
FIG. 2 is a block diagram showing the first embodiment of a knock sensing apparatus according to the present invention.

FIG. 2 shows the whole construction of the present embodiment. Referring to FIG. 2, two knock sensors 1 and 2 are mounted on an engine (that is, internal combustion engine), to detect the vibration generated in the engine. The knock sensors 1 and 2 are connected to a multiplexer 3, and a multiplexer controller 8 is connected, as a control circuit, to the multiplexer 3. Further, an Ne sensor 13 for detecting the rotational frequency or speed Ne of the engine and a cylinder discriminating sensor 14 are connected to the multiplexer controller 8. The multiplexer controller 8 controls the multiplexer 3 so that one of the output signals of the knock sensors 1 and 2 is changed over to the other by the multiplexer 3 on the basis of the outputs of the Ne sensor 13 and the cylinder discriminating sensor 14. The multiplexer 3 is connected to a switched capacitor filter 4.

Figure 3:
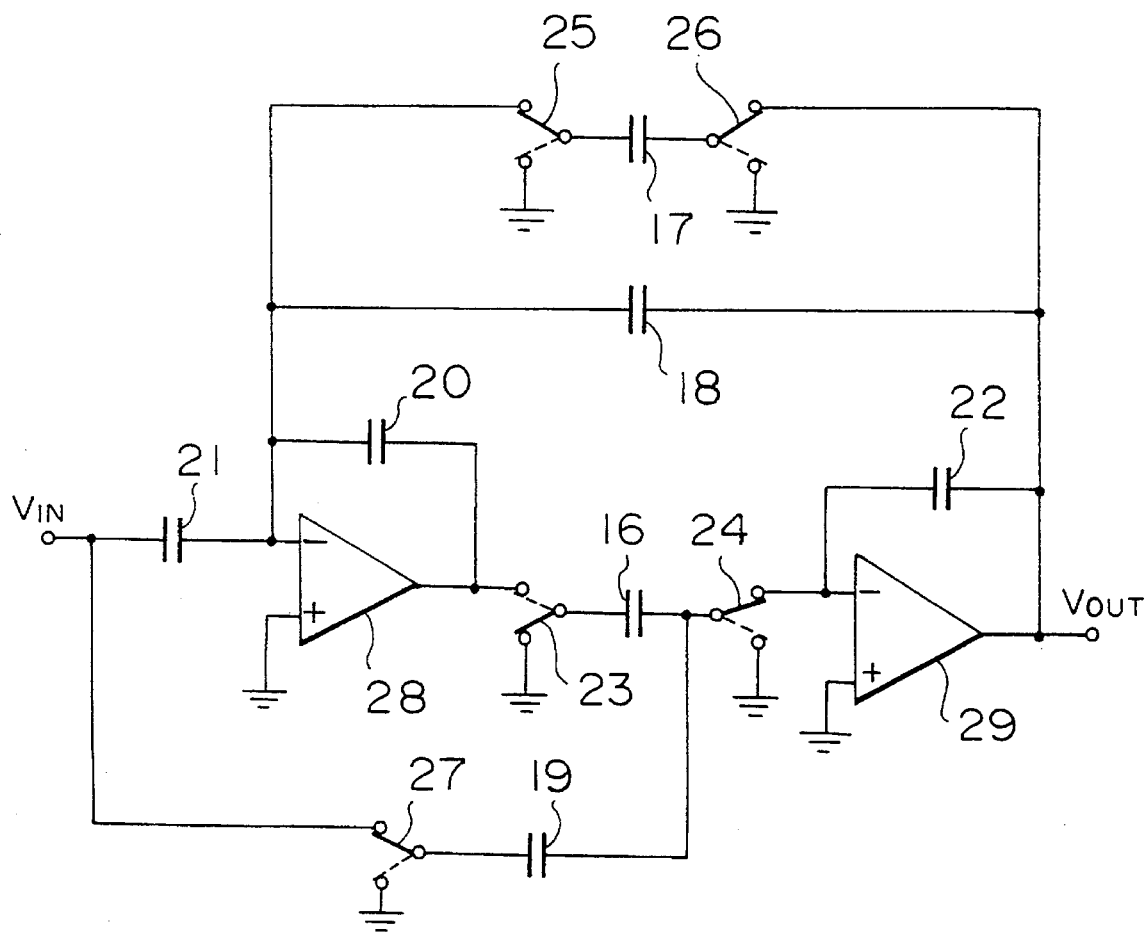
FIG. 3 is a circuit diagram showing the switched capacitor filter of FIG. 2.

FIG. 3 shows the actual circuit configuration of the switched capacitor filter 4. The present embodiment employs a secondary switched capacitor filter. That is, the switched capacitor filter 4 is made up of capacitors 16 to 22, switching elements (that is, FET) 23 to 27, and operational amplifiers 28 and 29.

In the switched capacitor filter 4, the switching elements 23 to 27 are periodically changed between one state which is indicated by solid lines in FIG. 3 and the other state which is indicated by broken lines, that is, they perform a switching action. Thus, the circuit configuration of FIG. 3 generates a kind of electric resistance, and functions as a filter. The switched capacitor filter 4 of FIG. 3 has a center frequency $f_0$ equal to $f_{CLK}/20$ (where $f_{CLK}$ indicates the frequency of a switching drive signal).

Figure 4:
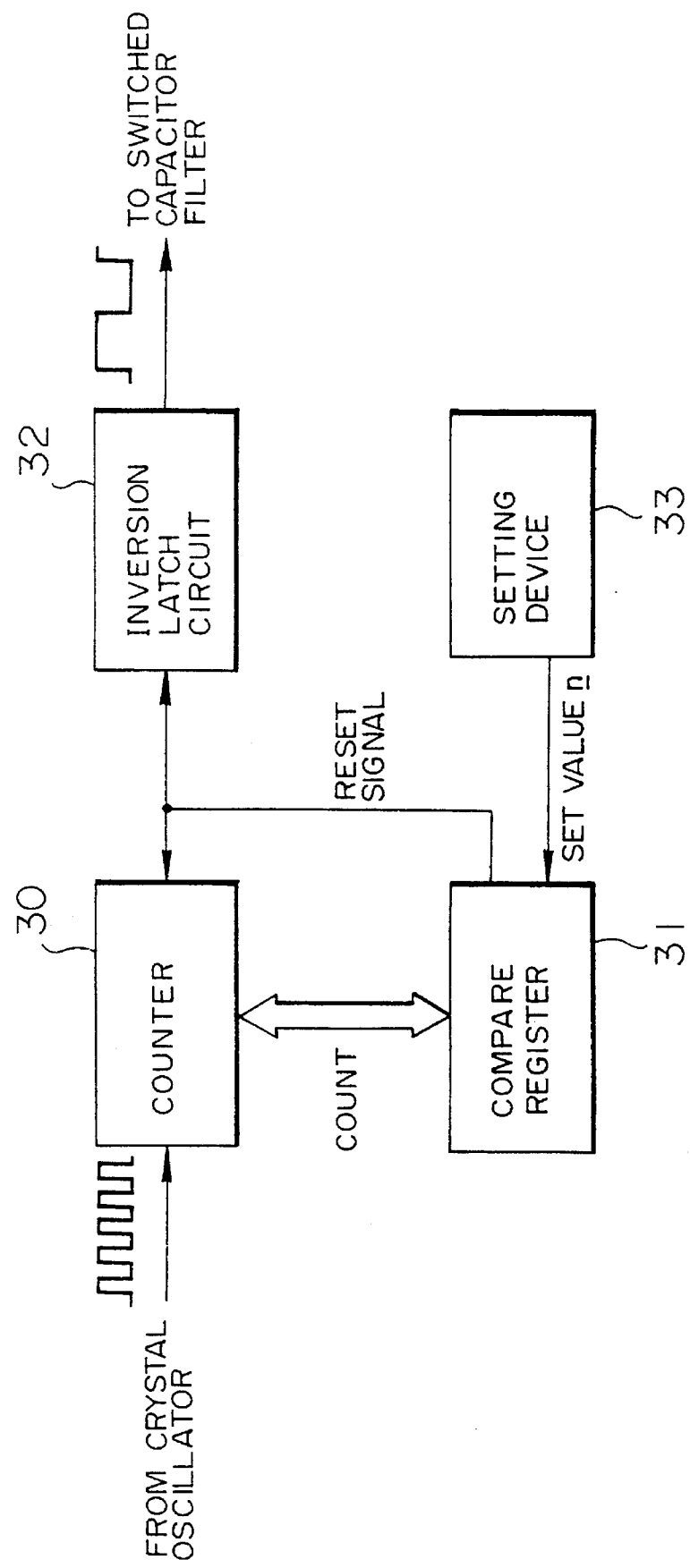
FIG. 4 is a block diagram showing the drive signal generating apparatus of FIG. 2 which produces a signal for driving the switched capacitor filter.
Figure 5:
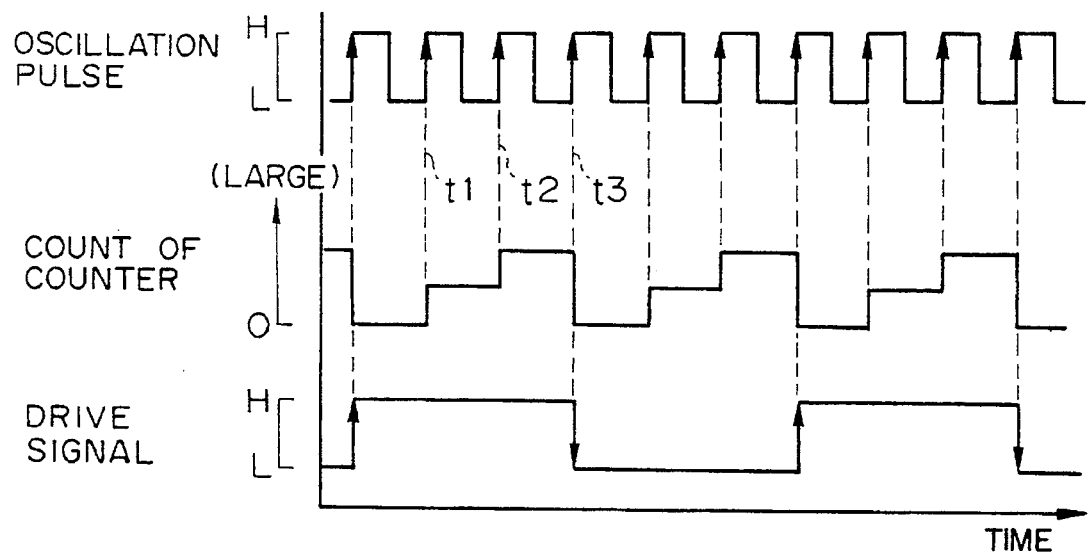
FIG. 5 is a time chart for explaining signal processing in the counter of FIG. 4.

Referring back to FIG. 2, a frequency characteristic controller 9 is connected, as a filter control circuit, to the switched capacitor filter 4. The frequency characteristic controller 9 is provided with a microcomputer 12 and a drive signal generating apparatus 10 shown in FIG. 4. As shown in FIG. 4, the drive signal generating apparatus 10 is made up of a counter 30, a compare register 31, an inversion latch circuit 32, and a setting device 33. A 1 MHz pulse signal from a crystal oscillator is applied to the counter 30. As shown in FIG. 5, the count of the counter 30 is incremented by one at each leading edge of the pulse signal. A value $n$ corresponding to a number, by which the frequency of an oscillation signal (namely, the pulse signal) is to be divided, is set in the setting device 33. In the present embodiment, the value $n$ equal to 2 or 3 is set in the setting device. The compare register 31 compares the count of the counter 30 with the value $n$ set in the setting device 33. When the count agrees with the value $n$, the compare register 31 resets the counter 30, that is, reduces the count of the counter 30 to zero. The inversion latch circuit 32 delivers a drive signal whose level, as shown in FIG. 5, changes from a high level to a low level or from the low level to the high level each time the counter 30 is reset.

Referring again to FIG. 2, the Ne sensor 13 for detecting the running state of the engine and the cylinder discriminating sensor 14 for discriminating among cylinders are connected to the frequency characteristic controller 9. These sensors 13 and 14 detect the rotational frequency of the engine and the numbers of the cylinders, respectively, and send detection signals to the frequency characteristic controller 9.

The switched capacitor filter 4 is connected to an amplifier 5, and the amplification factor thereof is controlled by an amplification factor controller 15. A detection part 6 is connected to the amplification factor controller 15. The detection part 6 is formed of a microcomputer, and is made up of a knock detecting circuit 6a and a failure detecting circuit 6b. The detection part 6 sends a detection signal corresponding to the output of a knock sensor to the amplification factor controller 15, which changes the amplification factor of the amplifier 5 in accordance with the output of the knock sensor.

Meanwhile, the amplifier 5 is connected to the knock detecting circuit 6a and the failure detecting circuit 6b. The knock detecting circuit 6a determines a knock judging level from the output signal of the amplifier 5. When the output of the amplifier is higher than the knock judging level, the knock detection circuit 6b judges that a knock is generated in the engine, and delivers a knock detection signal. The knock detecting circuit 6a is connected to a knock suppressing circuit 7. On receiving the knock detection signal, the knock suppressing circuit 7 controls ignition timing so that the knock is suppressed, that is, changes the ignition timing dependent upon the crank angle of the engine by a predetermined amount to suppress the knock.

The failure detecting circuit 6b determines a failure detecting level from the output signal of the amplifier 5. When the failure detecting level is lower than a predetermined failure judging level, the failure detecting circuit 6b judges that a failure is generated in a knock sensor signal system, and delivers a failure detection signal. The failure detecting circuit 6b is connected to the knock suppressing circuit 7. On receiving the failure detection signal, the knock suppressing circuit 7 changes the ignition timing by a predetermined amount so that ignition is carried out in safety.

Next, explanation will be made of the operation of the present embodiment, that is, the knock sensing apparatus for the internal combustion engine which has the above construction. The vibration in the engine is detected by the knock sensors 1 and 2. One of the output signals of the knock sensors 1 and 2 is selected by the multiplexer 3, and the selected output signal is applied to the switched capacitor filter 4, which transmits only a frequency band peculiar to the knock. The output signal of the filter 4 is amplified by the amplifier 5 to an appropriate level. On the basis of the amplified signal, the knock detecting circuit 6a, the failure detecting circuit 6b, and the knock suppressing circuit 7 carry out the knock detection, the failure detection, and the knock suppression, respectively.

At this time, the filtering characteristics of the switched capacitor filter 4 can be changed by varying the frequency $f_{CLK}$ of a switching drive signal. The frequency $f_{CLK}$ is varied by the frequency characteristic controller 9 in accordance with the rotational frequency Ne of the engine and the cylinder discriminating signal, and is then delivered.

Figure 7:
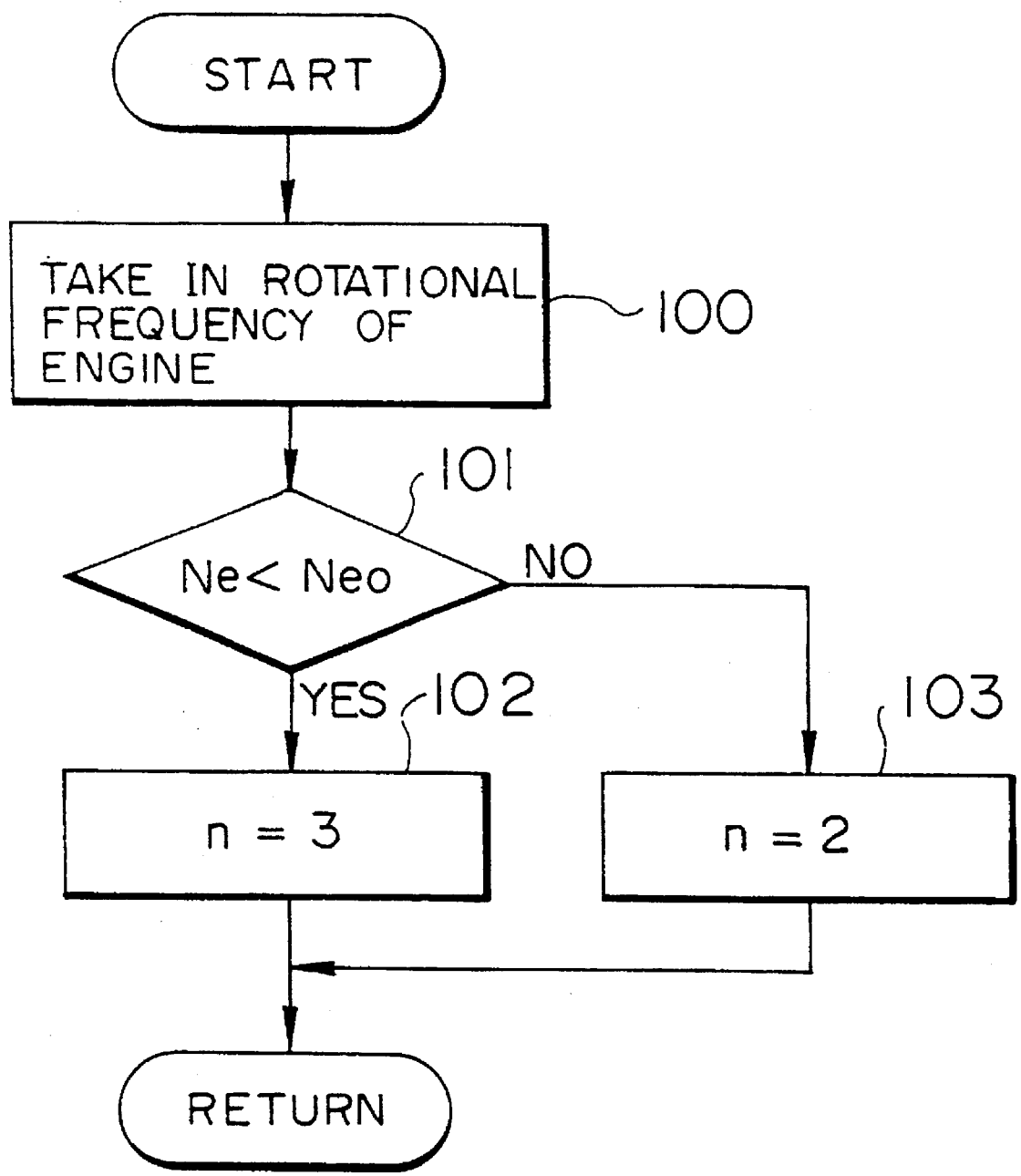
FIG. 7 is a flow chart for explaining an operation of the frequency characteristic controller of FIG. 2.

In more detail, the microcomputer 12 of the frequency characteristic controller 9 executes processing shown in FIG. 7, at fixed intervals. Referring to FIG. 7, the microcomputer 12 first takes in the rotational frequency Ne of the engine detected by the Ne sensor 13 (step 100). In step 101, the rotational frequency Ne of the engine is compared with a predetermined rotational frequency Neo (for example, 4,000 rpm). When the rotational frequency Ne of the engine is smaller than the predetermined rotational frequency Neo, the microcomputer 12 sets the value n equal to 3 (step 102) in the setting device 33 of FIG. 4. When the rotational frequency Ne of the engine is greater than or equal to the predetermined rotational frequency Neo, the value n is set equal to 2 (step 103) in the setting device 33.

In a case where the value n is set equal to 3 in the setting device 33, the count of the counter 30 of FIG. 4, as shown in FIG. 5, is incremented by one at each leading edge of the pulse signal from the crystal oscillator (that is, at each of time moments $t_1$, $t_2$ and $t_3$ shown in FIG. 5). The compare register 31 of FIG. 4 compares the count of the counter 30 with the value n (=3) set in the setting device 33. When the count agrees with the value n (=3), the count of the counter 30 is reduced to zero. That is, the counter 30 is reset at the time $t_3$ shown in FIG. 5. The inversion latch circuit 32 of FIG. 4 generates and delivers the switching drive signal whose level is changed from a high level to a low level or from the low level to the high level each time the counter 30 is reset.

Thus, when the value n is set equal to 3 in the setting device 33, the switching drive signal has a frequency of 167 KHz which is obtained by dividing 1 MHz by six.

Figure 6:
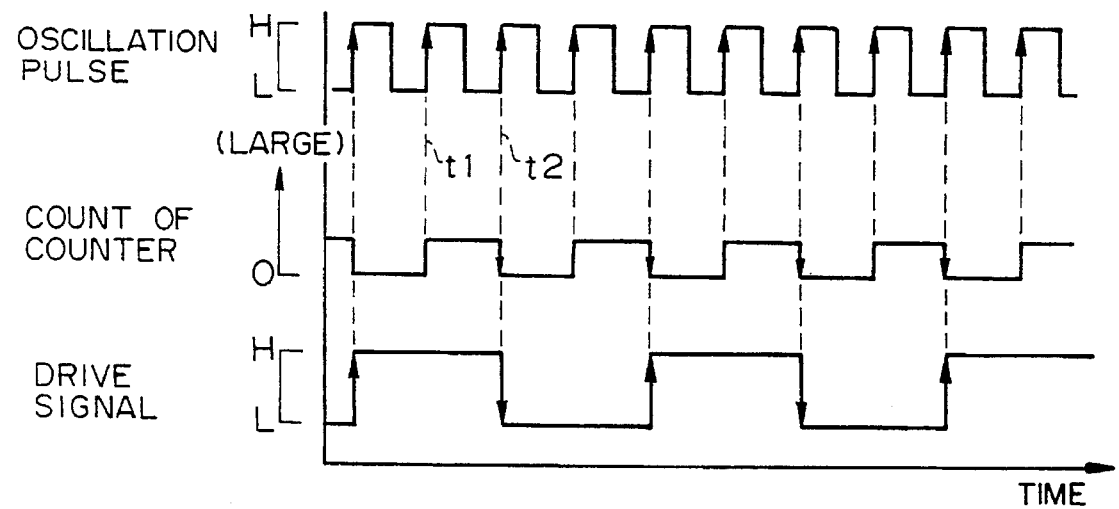
FIG. 6 is another time chart for explaining signal processing in the counter of FIG. 4.

On the other hand, in a case where the value n is set equal to 2 in the setting device 33, the count of the counter 30 is incremented by one at each leading edge of the pulse signal from the crystal oscillator as shown in FIG. 6 (that is, the counter 30 performs the counting operation at each of time moments $t_1$ and $t_2$ shown in FIG. 6). The compare register 31 compares the count of the counter 30 with the value n (=2) set in the setting device 33. When the count agrees with the value n (=2), the count of the counter 30 is reduced to zero. That is, the counter 30 is reset at the time $t_2$ shown in FIG. 6. The inversion latch circuit 32 generates and delivers the switching drive signal whose level is changed from a high level to a low level or from the low level to the high level each time the counter 30 is reset.

Thus, when the value n equal to 2 is set in the setting device 33, the switching drive signal has a frequency of 250 KHz which is obtained by dividing 1 MHz by four.

Figure 8:
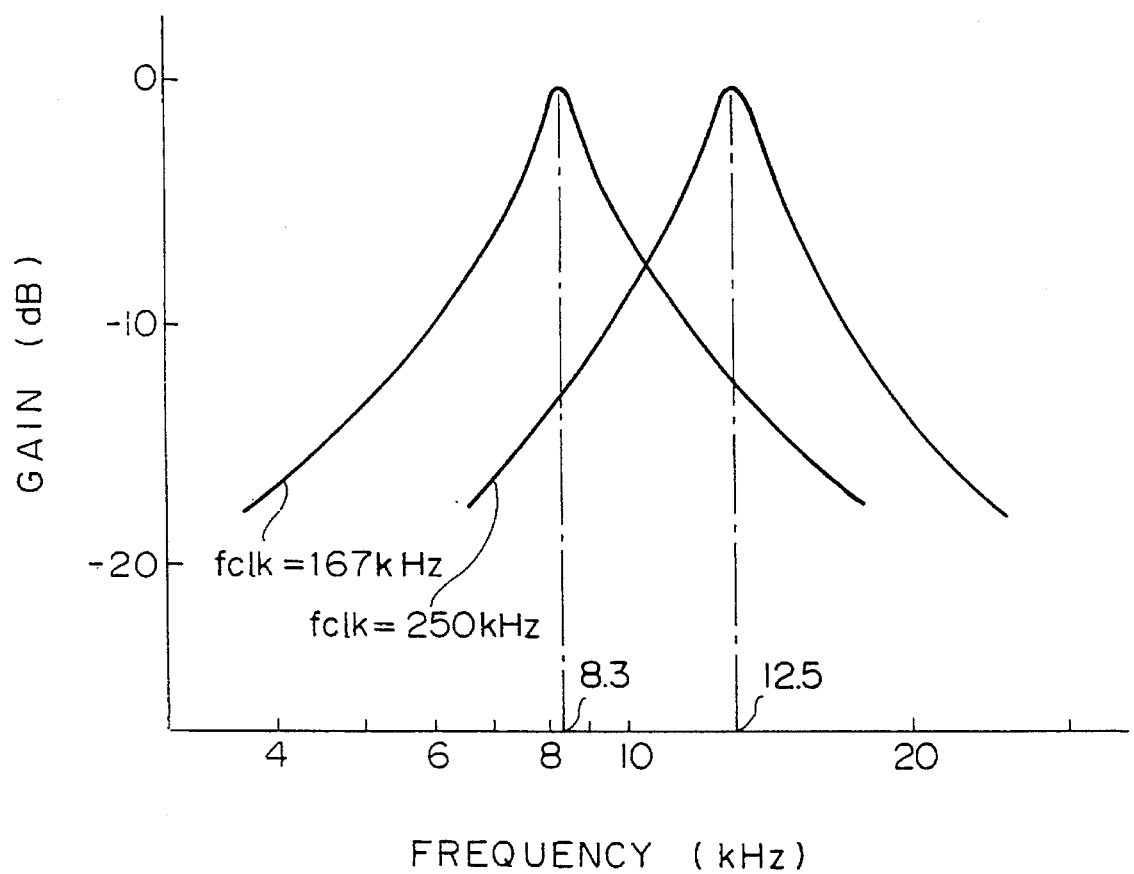
FIG. 8 is a graph showing the characteristics of the switched capacitor filter of FIG. 2.

The switching drive signal obtained by such frequency division is sent to the switched capacitor filter 4, to cause each of the switching elements 23 to 27 of the filter 4 to perform a switching operation. When the switching frequency of such a switching operation is changed, the impedance of the switched capacitor filter is changed, and the filtering characteristics thereof are also changed. In more detail, when the switched capacitor filter 4 is applied with the switching drive signal having a frequency of 167 KHz, the switched capacitor filter 4 acts as a filter having a center frequency of 8.3 KHz as shown in FIG. 8. When the switched capacitor filter 4 is applied with the switching drive signal having a frequency of 250 KHz, the filter 4 acts as a filter having a center frequency of 12.5 KHz. That is, when the rotational frequency Ne of the engine is smaller than the predetermined rotational frequency Neo, the switched capacitor filter 4 acts as a filter having a center frequency of 8.3 KHz. When the rotational frequency Ne of the engine is greater than or equal to the predetermined rotational frequency Neo, the switched capacitor filter 4 acts as a filter having a center frequency of 12.5 KHz.

Figure 9:
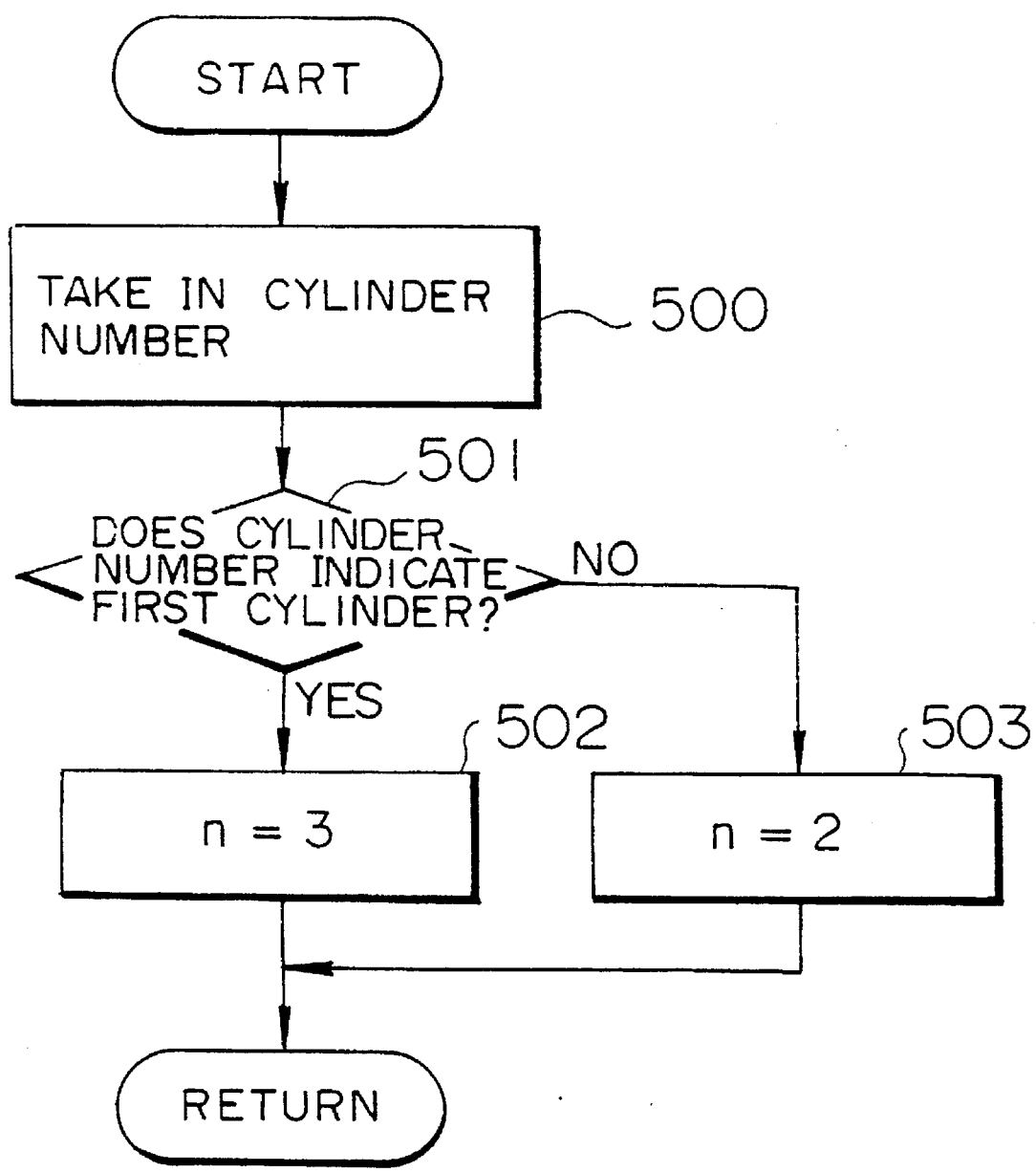
FIG. 9 is a flow chart for explaining another operation of the frequency characteristic controller of FIG. 2.

Further, the microcomputer 12 of the frequency characteristic controller 9 carries out the processing shown in FIG. 9 at fixed intervals. Referring to FIG. 9, the microcomputer 12 first takes in a cylinder number detected by the cylinder discriminating sensor 14 (step 500). In step 501, it is checked whether the detected cylinder number indicates the first cylinder. When the detected cylinder number indicates the first cylinder, the microcomputer 12 sets the value n equal to 3 in the setting device 33 (step 502). When the detected cylinder number indicates a cylinder other than the first cylinder, the microcomputer 12 sets the value n equal to 2 in the setting device 33 (step 503).

In the present embodiment, one of two kinds of pass bands of the filter 4 is selected according to whether the detected cylinder is the first cylinder. It is needless to say that the combination of the cylinder and the pass band of the filter 4 may be freely designed in accordance with the characteristics of the engine.

In many engines, the optimum pass band of the filter 4 varies with cylinders. Accordingly, the optimum combination of the cylinder and the pass band of the filter 4 is designed to improve knock detection accuracy.

Figure 10:
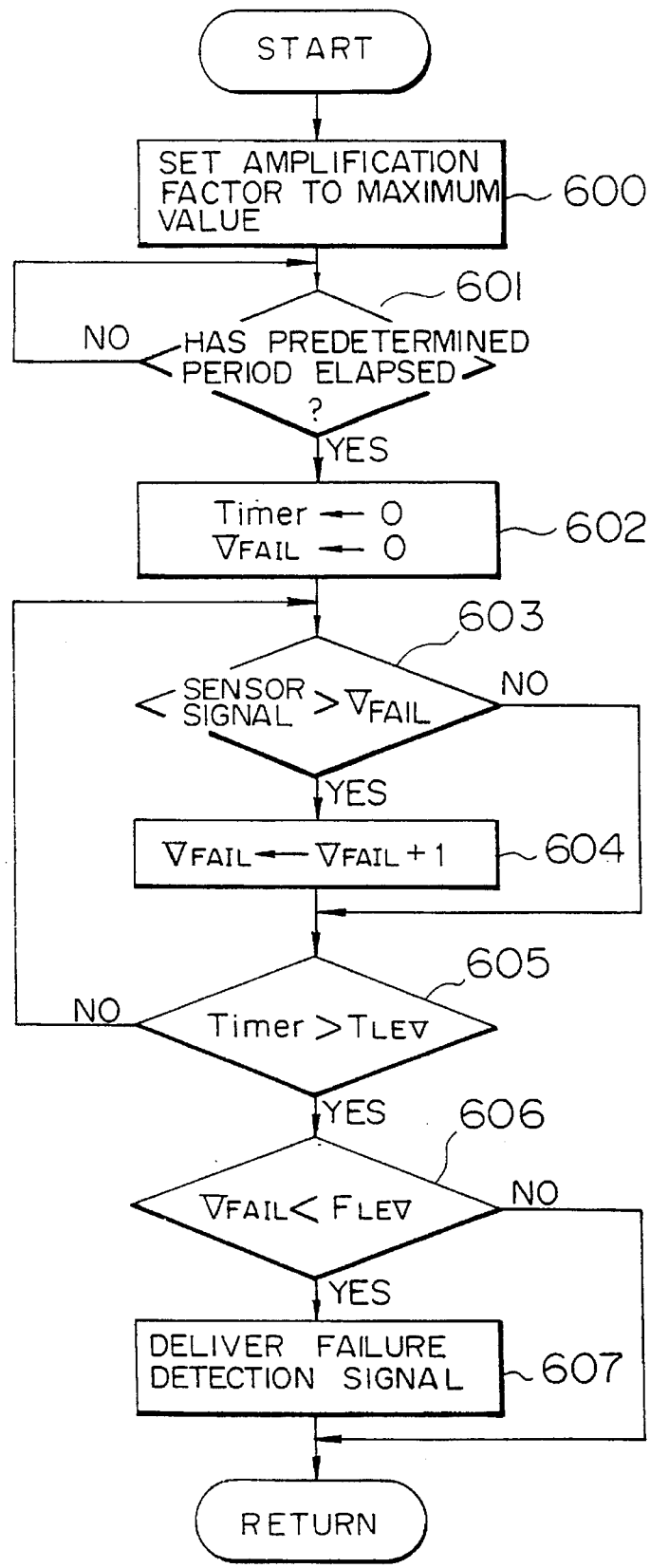
FIG. 10 is a flow chart for explaining the operation of the failure detecting circuit of FIG. 2.

FIG. 10 is a flow chart for explaining the processing of a microcomputer which forms the failure detecting circuit 6b. In the present embodiment, the processing of FIG. 10 is carried out when the multiplexer 3 performs a changeover operation under the control of the multiplexer controller 8, or when a changeover in pass band of the switched capacitor filter 4 is carried out by the frequency characteristic controller.

Referring to FIG. 10, the amplification factor controller 15 sets the amplification factor of the amplifier 5 to a maximum value, to detect a failure correctly (step 600). Next, it is checked whether or not a predetermined time necessary for eliminating the influence due to the changeover of one of the output signals of the knock sensors 1 and 2 to the other output signal by the multiplexer 3 or the influence due to the changeover in pass band of the switched capacitor filter 4, has elapsed (step 601). In a case where the predetermined time has not elapsed, a waiting state is kept till the predetermined time has elapsed. When the predetermined time has elapsed, a timer and a failure detecting level $V_{FAIL}$ are reset to zero (step 602).

In step 603, the output signal of the knock sensor which has been amplified by the amplifier 3, is compared with the failure detecting level $V_{FAIL}$. When the output signal of the knock sensor is higher than the level $V_{FAIL}$, the failure detecting level $V_{FAIL}$ is incremented (step 604). When the output signal of the knock sensor is lower than or equal to the level $V_{FAIL}$, the processing in step 605 is carried out without executing the processing in step 604.

In step 605, it is checked whether a predetermined period $T_{LEV}$ has elapsed. In a case where the value of the timer is smaller than or equal to the value $T_{LEV}$, that is, the predetermined period $T_{LEV}$ has not elapsed, the present time is judged to be in a failure detecting period, and the processing in step 603 is again carried out. In a case where the value of the timer is greater than the value $T_{LEV}$, that is, the predetermined period $T_{LEV}$ has elapsed, the processing in the next step is executed. The processing in steps 603 to 605 is carried out to appropriately detect each peak of that output signal of the knock sensor which has passed through the amplifier 5. The value $T_{LEV}$ indicates the length of the failure detecting period.

Next, the failure detecting level $V_{FAIL}$, which is obtained when the failure detecting period has elapsed, is compared with the failure judging level $F_{LEV}$ which is predetermined in accordance with the running state of the engine such as the rotational frequency thereof (step 606). In a case where the level $V_{FAIL}$ is lower than the level $F_{LEV}$, it is judged that a failure is generated in the knock sensor signal system, and the failure detection signal is sent to the knock suppressing circuit 7 (step 607), to complete the present processing. In a case where the level $V_{FAIL}$ is higher than or equal to the level $F_{LEV}$, it is judged in step 606 that the knock sensor signal system is normal, and the present processing is completed without executing any other processing.

Figure 11:
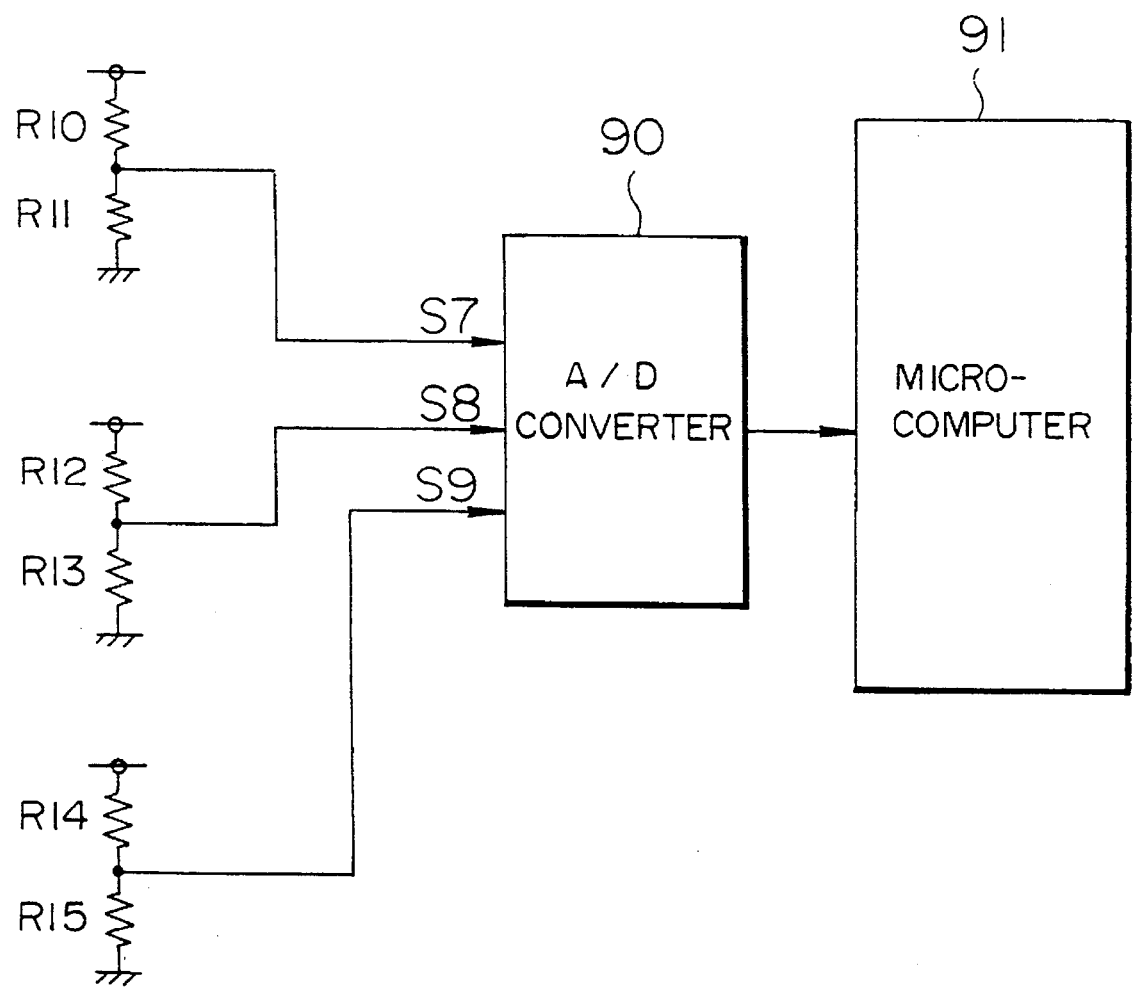
FIG. 11 is a block diagram showing a main part of the second embodiment of a knock sensing apparatus according to the present invention.

Next, the second embodiment of a knock sensing apparatus according to the present invention will be described in such a manner that the difference between the first and second embodiments is mainly explained. A circuit shown in FIG. 11 is used to adjust parameters concerning judgements on a knock and a failure. For example, three kinds of voltages are produced by means of resistors $R_{10}$ to $R_{15}$, to be applied to an A–D converter 90 through input signal lines $S_7$ to $S_9$. These voltages are successively converted by the A–D converter 90 into digital voltage values under control of a microcomputer 91 which forms the knock detecting circuit 6a and the failure detecting circuit 6b each shown in FIG. 2. The parameters concerning judgements on a knock and a failure such as the knock judging level and the failure judging level, are determined in accordance with each of the digital voltage values.

Figure 12:
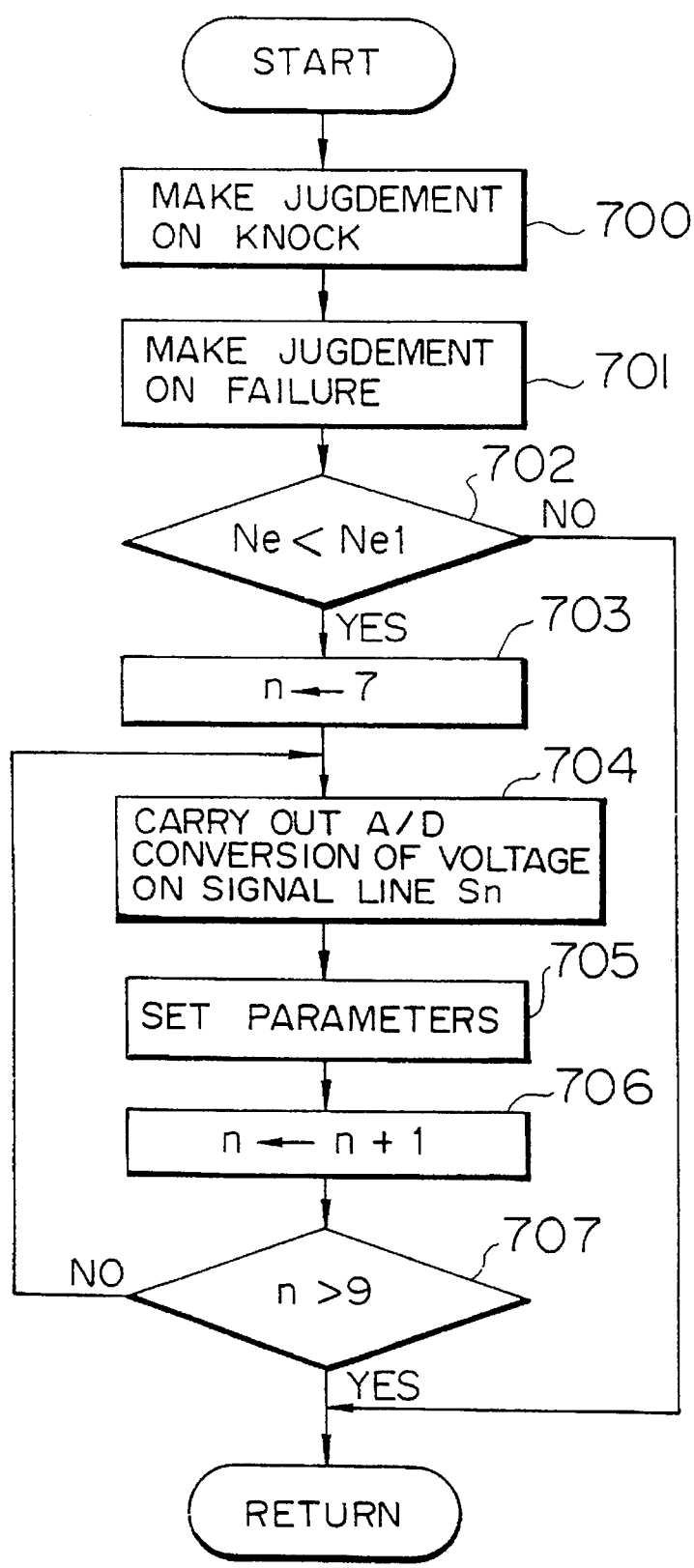
FIG. 12 is a flow chart for explaining the operation of the microcomputer of FIG. 11.

FIG. 12 is a flow chart for explaining the processing which is executed by the microcomputer 91. Referring to FIG. 12, the judgement on the knock is made (step 700). In step 701, the judgement on the failure is made. Next, the rotational frequency Ne of the engine is compared with a predetermined rotational frequency Ne1 (step 702). In a case where the rotational frequency Ne is smaller than the predetermined rotational frequency Ne1 (for example, 3,000 rpm), the number $\underline{n}$ of the input signal line connected to the A–D converter 90 is set to an initial value "7" (step 703). In step 704, the voltage on the input signal line $S_7$ specified by the number n=7 is converted by the A–D converter 90 into digital data.

Next, the parameters concerning the judgement on the knock/failure are altered in accordance with the value of the digital data thus obtained (step 705). In step 706, the number $\underline{n}$ of the input signal line connected to the A–D converter is incremented by one. Then, it is checked whether the number $\underline{n}$ of the input signal line exceeds nine (step 707). In a case where the number $\underline{n}$ does not exceed nine, it is judged that the conversion of the voltages on all the input signal lines into digital data and the determination of the parameters concerning the judgement on the knock/failure are not yet completed, and thus the processing in step 704 is again carried out. In a case where the number $\underline{n}$ exceeds nine, it is judged that the conversion of the voltages on all the input signal lines into digital data and the determination of the parameters concerning the judgement on the knock/failure have been completed, and the above processing is completed.

In a case where it is judged in step 702 that the rotational frequency Ne of the engine is greater than or equal to the predetermined rotational frequency Ne1, the processing is completed without carrying out the A–D conversion of voltages on the input signal lines $S_7$ to $S_9$, and without determining parameters concerning the judgement on the knock/failure.

When the A–D conversion and the determination of the parameters both necessary for judging the knock/failure are carried out in addition to the judgement on the knock/failure, a long time is required. Accordingly, when the rotational frequency of the engine becomes large, it will be impossible to carry out all processing. According to the second embodiment, there is no fear of terminating the desired processing in the course thereof, and the processing can be carried out correctly.

Next, the third embodiment of a knock sensing apparatus according to the present invention will be described in such a manner that the difference between the first and third embodiments is mainly explained. In the third embodiment, the processing carried out in step 101 of FIG. 7 for determining the value $\underline{n}$ set in the setting device 33, makes use of a hysteresis characteristic.

Figure 13:
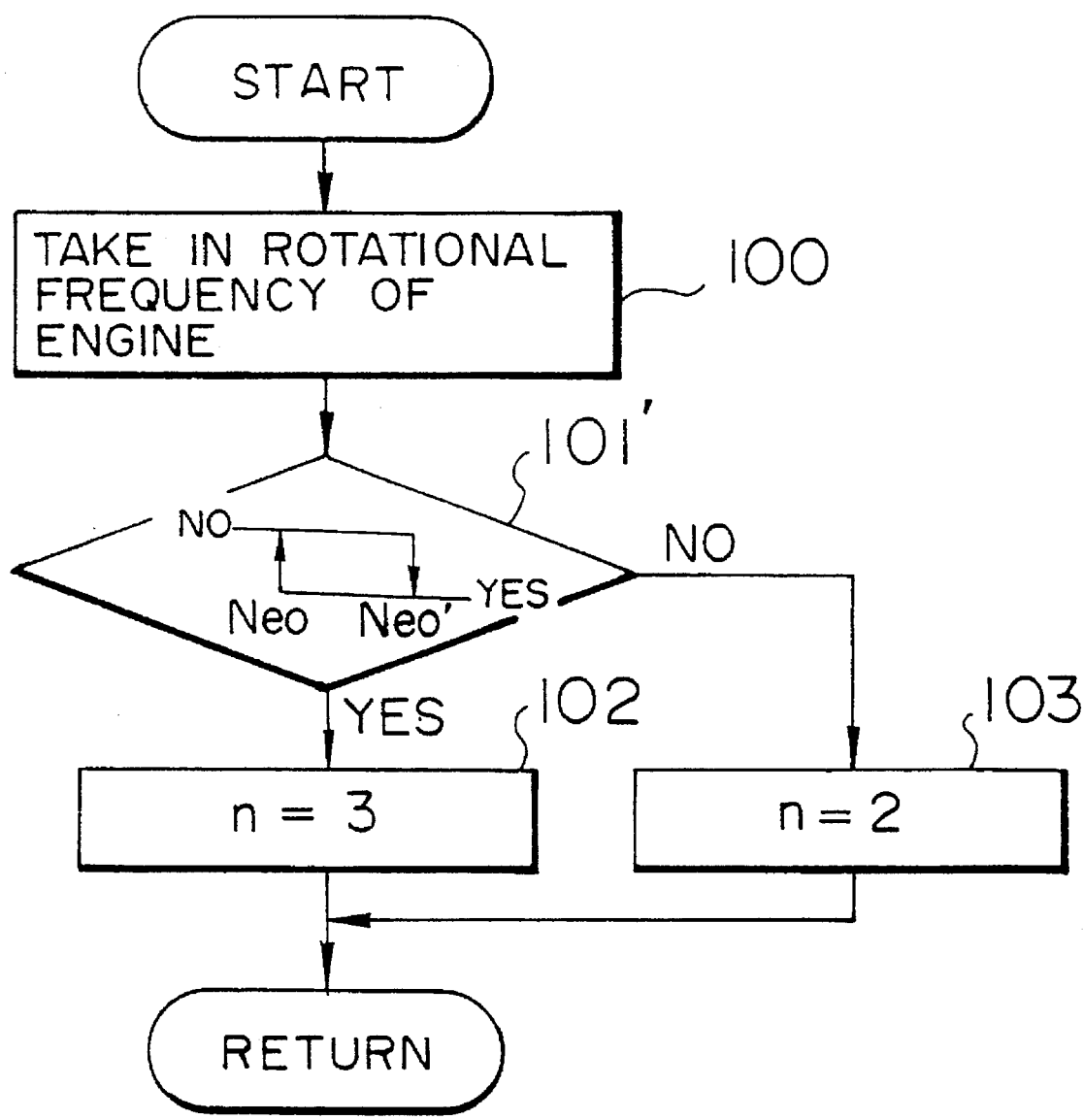
FIG. 13 is a flow chart for explaining the operation of the third embodiment of a knock sensing apparatus according to the present invention.

In more detail, referring to the flow chart of FIG. 13, the microcomputer 12 takes in the rotational frequency of the engine (step 100). In the next step 101', the rotational frequency of the engine is judged on the basis of a hysteresis characteristic that a YES-state is changed to a NO-state at the predetermined rotational frequency Neo and the NO-state is changed to the YES-state at a rotational frequency Neo' which is 400 rpm lower than the predetermined rotational frequency Neo. When the rotational frequency of the engine lies in the YES-state, the number n=3 is set in the setting device (step 102). When the rotational frequency of the engine lies in the NO-state, the number n=2 is set in the setting device 33 (step 103). Thus, the present routine is completed.

When the number $\underline{n}$ set in the setting device 33 is determined on the basis of the hysteresis characteristic as mentioned above, it is prevented that the changeover of one of two values "2" and "3" set in the setting device 33 to the other value occurs very often due to rotational frequencies of the engine generating in the vicinity of the predetermined rotational frequency Neo, and thus optimum knock detection is carried out.

Figure 14:
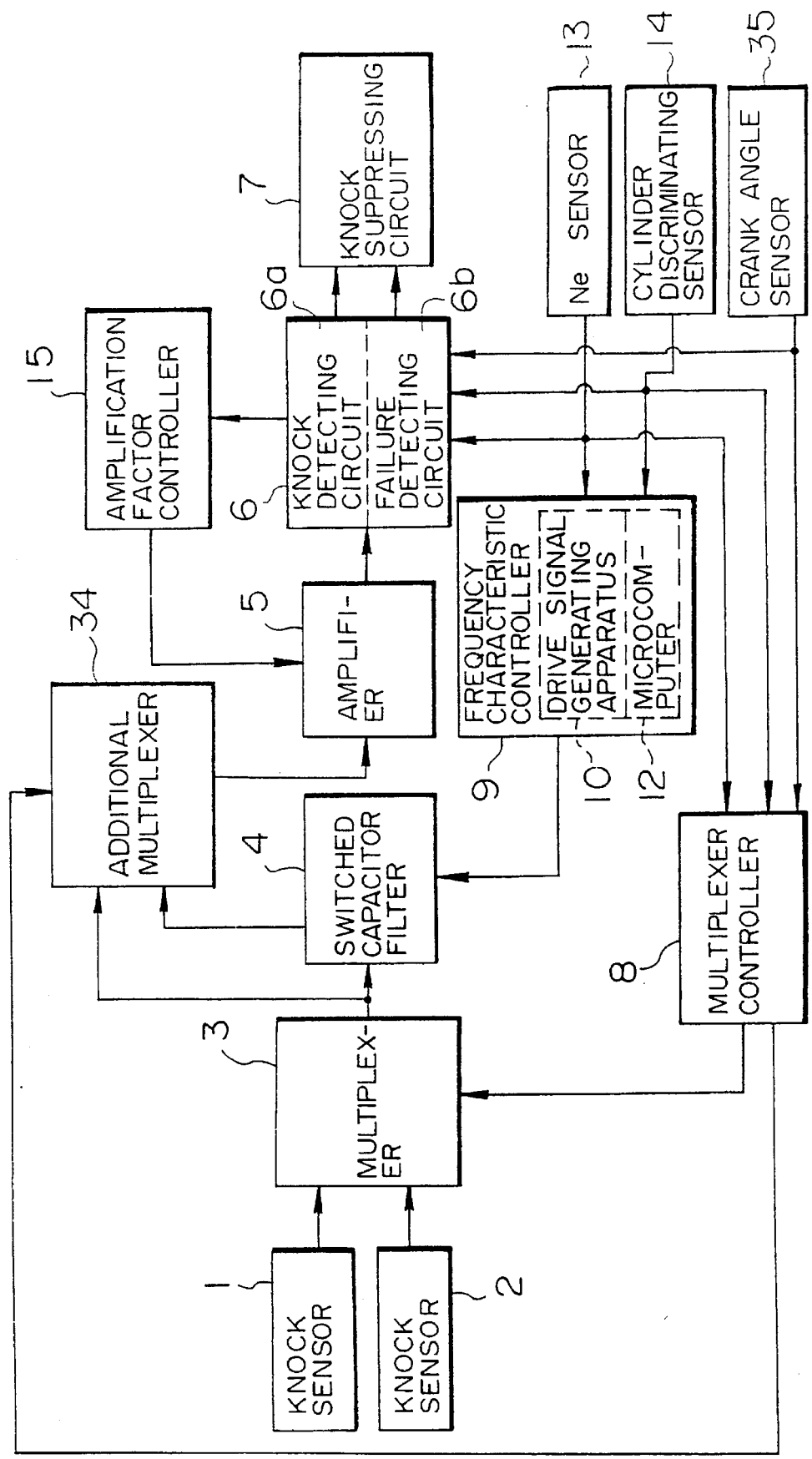
FIG. 14 is a block diagram showing the fourth embodiment of a knock sensing apparatus according to the present invention.
Figure 15:
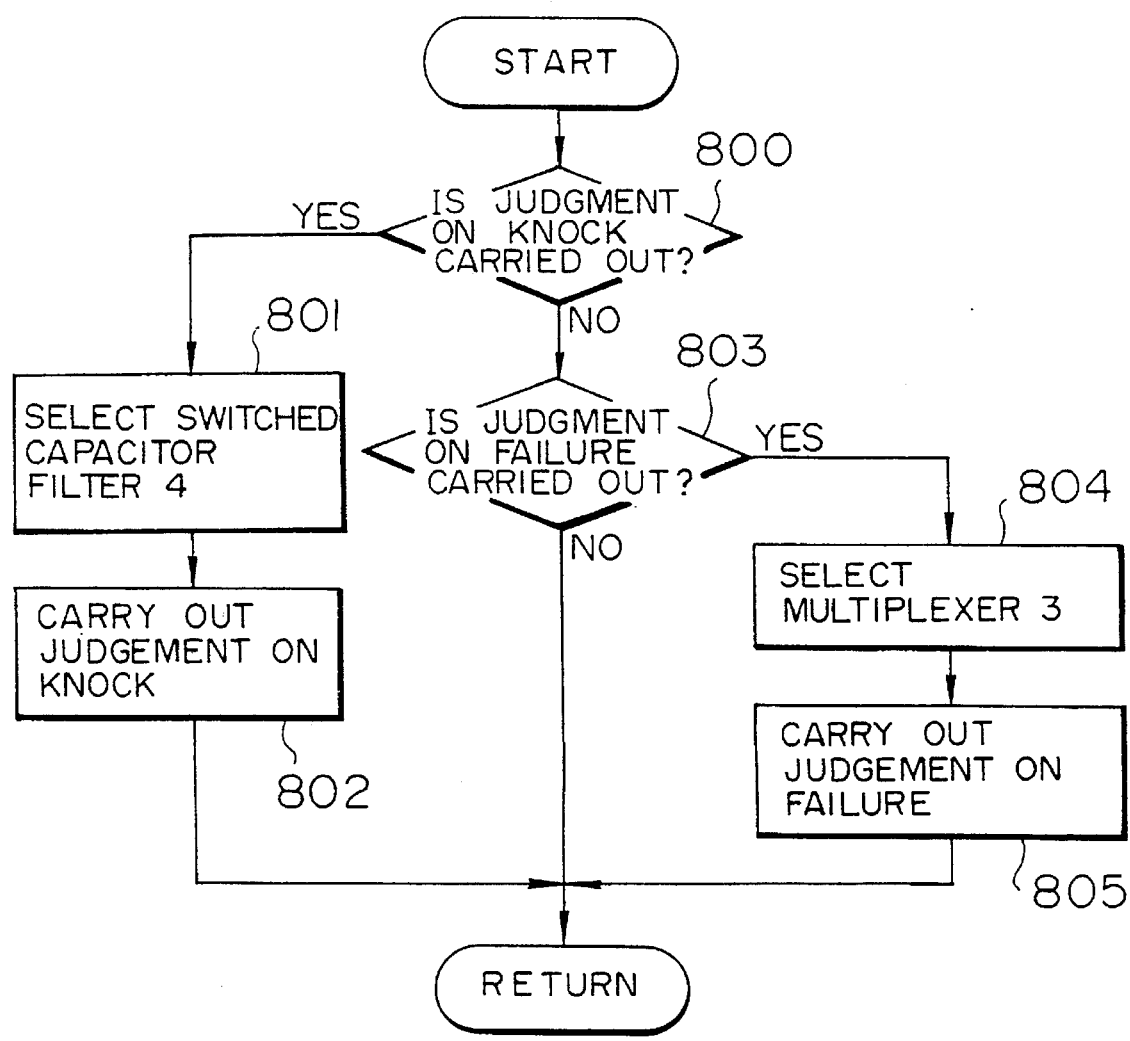
FIG. 15 is a flow chart for explaining the operation of the fourth embodiment of FIG. 14.

Next, the fourth embodiment of a knock sensing apparatus according to the present invention will be described in such a manner that the difference between the first and fourth embodiments is mainly explained. FIG. 14 shows the construction of the fourth embodiment. Referring to FIG. 14, the present embodiment includes an additional multiplexer 34 for selecting one of the output signal of the multiplexer 3 and the output signal of the switched capacitor filter 4 to apply the selected output signal to the amplifier 5, in addition to the multiplexer 3 for selecting one of the output signals of the knock sensors mounted on different cylinders. The additional multiplexer 34 is controlled by the multiplexer controller 8, together with the multiplexer 3. The present embodiment further includes a crank angle sensor 35 for generating information on a crank angle. FIG. 15 is a flow chart for explaining the control operation of the additional multiplexer 34. The judgement on the knock/failure in the present embodiment will be explained below, in accordance with the flow chart. It is to be noted that a routine shown in FIG. 15 is executed for each of predetermined crank angles.

Referring to FIG. 15, it is first checked whether a knock judging condition is satisfied (step 800). For example, a crank angle corresponding to a rotational angle of 20° after the top dead center, that is, ATDC 20° CA is used as the knock judging condition. In a case where the crank angle now used is ATDC 20° CA, the processing in step 801 is carried out. That is, in step 801, the output of the switched capacitor filter 4 is selected by the additional multiplexer 34. Then, the judgement on the knock is carried out in step 802, to complete the present routine.

In a case where it is judged in step 800 that the knock judging condition is not satisfied, the precessing in step 803 is carried out. That is, it is checked in step 803 whether a failure judging condition is satisfied. In the present embodiment, for example, ATDC 70° CA is used as the failure judging condition. In a case where the crank angle now used is ATDC 70° CA, the output of the multiplexer 3 is selected by the additional multiplexer 34 (step 804). Then, the judgement on the failure is carried out in step 805, to complete the present routine.

When the above processing is carried out, the output signal of the multiplexer 3 is used for judging the failure, without passing through the switched capacitor filter 4. Thus, a delay due to the passage of the above signal through the switched capacitor filter 4 is eliminated. Accordingly, even in a case where the outputs of a plurality of knock sensors are applied to the multiplexer 3, the judgement on the failure can be correctly performed. In the present embodiment, two knock sensors 1 and 2 are used. Even when a single knock sensor is used, the delay due to the switched capacitor filter is eliminated, and thus a failure can be detected immediately after the generation thereof.

Figure 16:
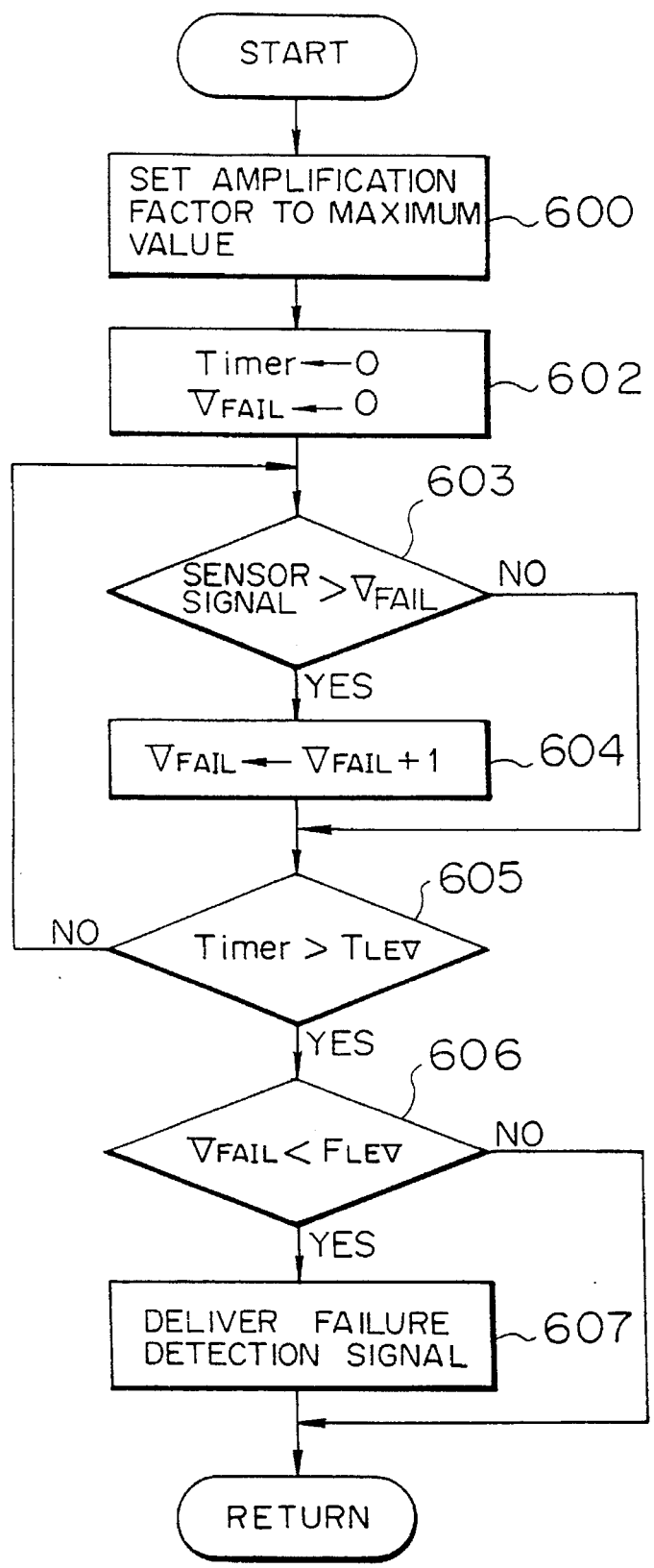
FIG. 16 is a flow chart for explaining the failure detection processing of the fourth embodiment.

FIG. 16 is a flow chart showing processing which is carried out by a microcomputer for forming the failure detecting circuit 6b of the fourth embodiment. The flow chart of FIG. 16 is different from the flow chart of FIG. 10 only in that the processing in step 601 is omitted. Therefore, explanation of the flow chart of FIG. 16 will be omitted. That is, in the present invention, it is unnecessary to take into account a delay due to the passage of a signal through the switched capacitor filter 4, and thus the processing in step 602 can be carried out immediately after the processing in step 600.

Figure 17:
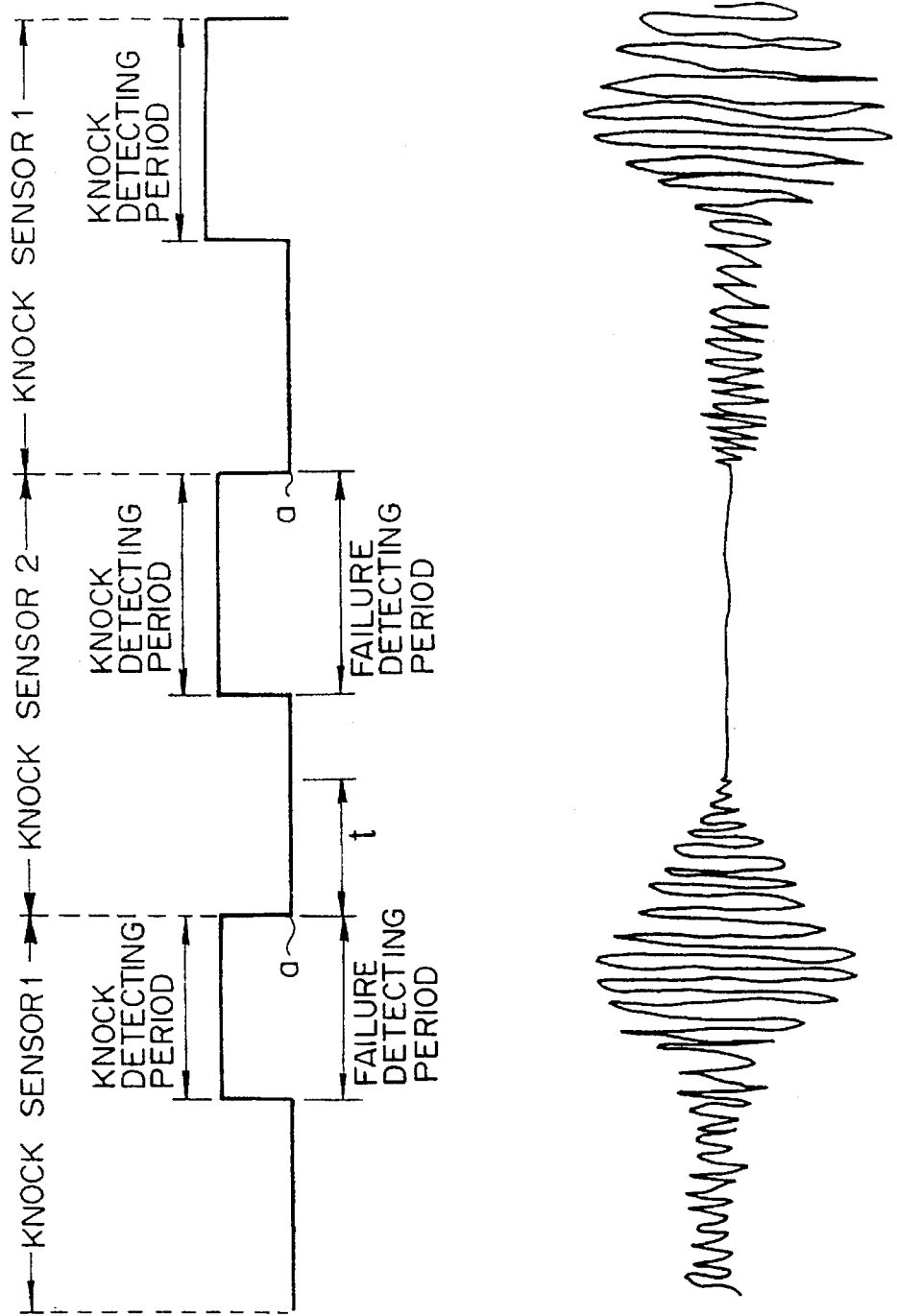
FIG. 17 is a time chart for explaining the fifth embodiment.

Next, the fifth embodiment of the present invention will be described. In the fifth embodiment, as shown in FIG. 17, knock detection and failure detection are performed in the same section and the input switching of the knock sensor and the frequency switching of the switched capacitor filter 4 are carried out after the failure detection.

Figure 18:
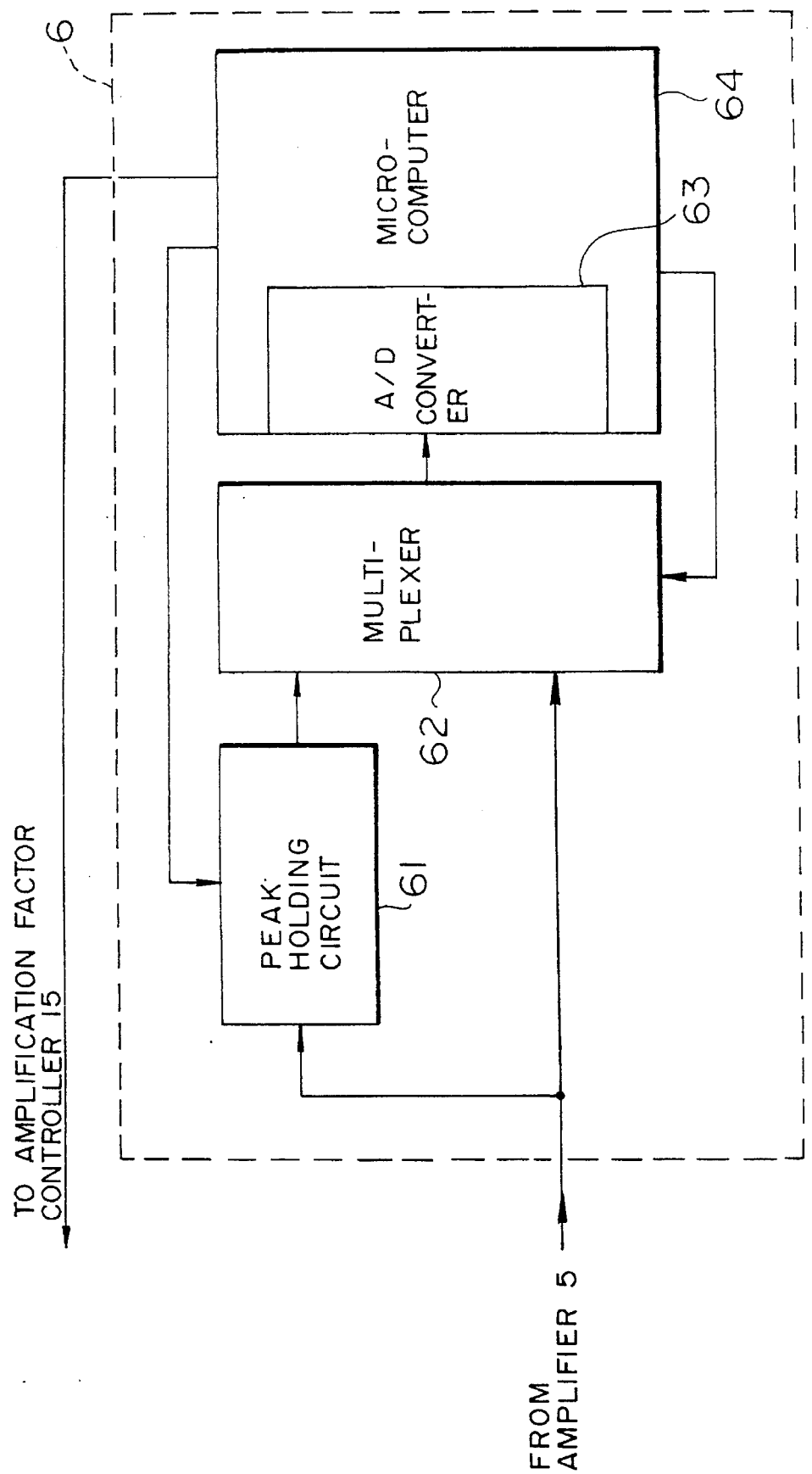
FIG. 18 is a block diagram showing the knock detecting circuit and failure detecting circuit of the fifth embodiment.

Although the system configuration of the fifth embodiment is the same as that of the first embodiment as shown in the block diagram of FIG. 2, the interior configuration of the detection part 6 including the knock detecting circuit and failure detecting circuit will be described more in detail. FIG. 18 is a block diagram showing the interior configuration of the detection part 6 including the knock detecting circuit and failure detecting circuit shown in FIG. 2. The block diagram will be described below.

The signal transmitted from the amplifier 5 and inputted into the detection part 6 including the knock detecting circuit and failure detecting circuit is separated into a signal which is supplied into a multiplexer 62 through a peak holding circuit 61 and another signal which is supplied directly to the multiplexer 62. The multiplexer 62 selects a signal to be supplied to an A/D (analog-to-digital) converter 63 in a microcomputer 64 on the basis of a signal from the microcomputer 64. In this embodiment, the multiplexer 62 selects the signal supplied directly from the amplifier 5 to the multiplexer 62 in the failure (knock) detecting section, and selects the other signal passed through the peak holding circuit 61 after completion of the failure detecting section.

The microcomputer 64 supplies a peak holding start signal and a peak holding stop signal to the peak holding circuit 61. The microcomputer 64 supplies another signal to an amplification factor controller 15 to adjust the amplification factor of the amplifier 5 in accordance with the magnitude of a signal supplied to the microcomputer 64.

Figure 19:
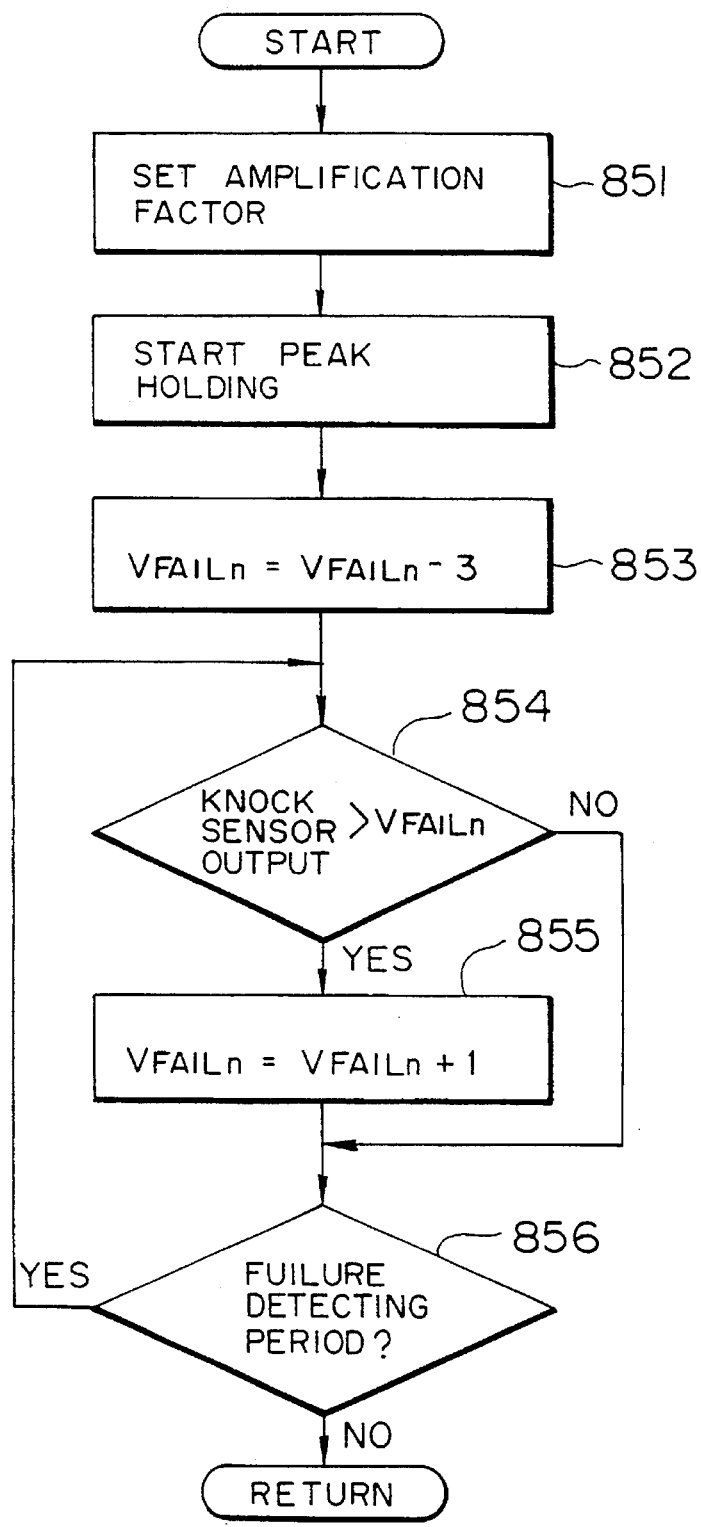
FIG. 19 is a flow chart for explaining the operation of the fifth embodiment.

FIG. 19 is a failure (knock) detection process which is performed by the microcomputer 64 in the fifth embodiment. Referring to FIG. 19, description will be made below. This flow chart is carried out by angular interruption at a predetermined crank angle. When this process is carried out, a signal is being supplied from the microcomputer 64 to the multiplexer 62 so that the multiplexer 62 selects the output signal of the amplifier 5 which is supplied directly to the multiplexer 62.

When this process is carried out, the amplification factor is set so as to correspond to the magnitude of the knock sensor output in step 851. That is, a signal is supplied to the amplification factor controller 15 so that the amplification factor is made to be a predetermined value. In next step 852, the knock sensor output is peak-held so as to detect a knock. That is, the peak holding start signal is supplied to the peak holding circuit 61. In step 853, a predetermined value (an optimum value determined through an experiment; 3 in this embodiment) is subtracted from a failure detecting level $V_{FAILn}$. Here, the subscript n represents the knock sensor number which is selected at present. Next, in step 854, judgment is made as to whether the knock sensor output A/D converted without being passed through the peak holding circuit 61 is larger than the failure detecting level $V_{FAILn}$. If YES in the step 854, the operation goes to step 855 while if NO in the step 854, the operation goes to step 856. In the step 855, the failure detecting level $V_{FAILn}$ is incremented and the operation goes to the step 856. In the step 856, judgment is made as to whether it is in the failure detecting period. If YES in the step 856, the operation is returned to the step 854 to repeat the aforementioned process, while if NO in the step 856, this process is ended.

By carrying out the above-mentioned process, the value of the failure detecting level $V_{FAILn}$ becomes large in the case where the sensor is normal. If the knock sensor becomes abnormal so that the output level thereof becomes zero, the failure detecting level is decreased 3 by 3 in the step 853. Accordingly, the value of the failure detecting level in the abnormal case becomes considerably smaller than that in the normal case.

Figure 20:
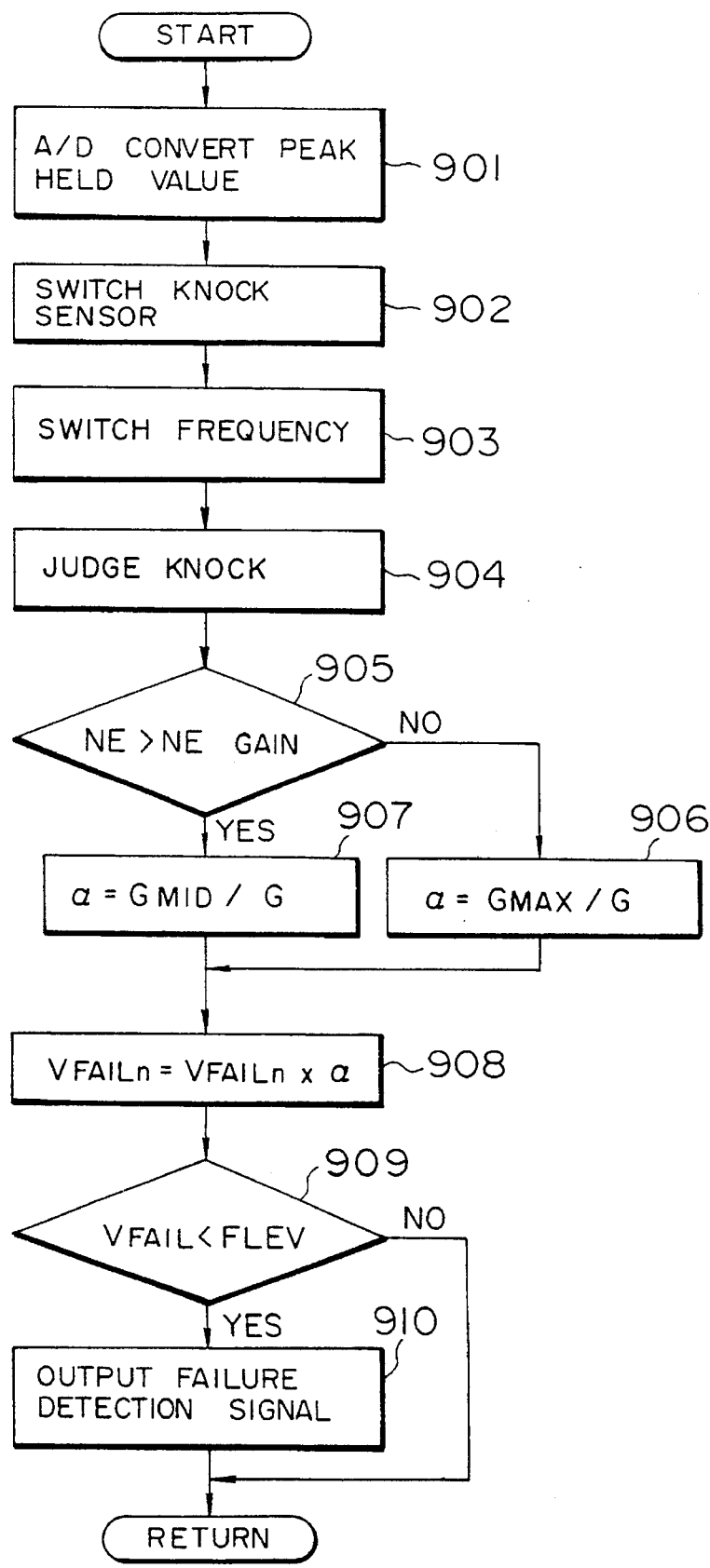
FIG. 20 is a flow chart for explaining the operation of the fifth embodiment.

FIG. 20 is a flow chart describing the operation which is carried out after termination of the failure detecting period by the microcomputer 64 (point a in FIG. 17). Referring to FIG. 20, description will be made below.

If this process is carried out, in step 901, the output signal of the peak holding circuit 61 is made to be the selected signal of the multiplexer 62 so that the peak held value for knock detection is taken into the A/D converter 63 so as to be A/D converted therein. Then, the peak holding stop signal is supplied to the peak holding circuit 61 so as to reset the current value. Next, the knock sensor is switched in step 902 and the signal pass frequency band of the switched capacitor filter 4 is switched in step 903. Further, knock judgment is made in step 904 in accordance with the knock sensor output A/D converted in the step 901. Here, upon completion of the knock judgment, the microcomputer 64 supplies a signal to the peak holding circuit 61 so that the peak holding circuit 61 selects the signal supplied from the amplifier 5 directly to the peak holding circuit 61. In step 905, judgment is made as to whether the rotational frequency or speed NE of the engine is larger than a predetermined value $NE_{GAIN}$. Here, the operation goes to step 907 if YES in the step 905, or goes to step 906 if NO. In the step 906, the maximum amplification factor $G_{MAX}$ is divided by the current amplification factor G to obtain the failure detecting level conversion multiplier α and then the operation goes to step 908. In the step 907, the amplification factor $G_{MID}$ smaller than the maximum amplification factor $G_{MAX}$ is divided by the current amplification factor G to obtain the failure detecting level conversion multiplier α and then the operation goes to step 908. In the step 908, the failure detecting level $V_{FAILn}$ (here n represents the knock sensor number before switching the knock sensor in the step 902) is multiplied by the value α so that it is converted into a value corresponding to $G_{MAX}$ or $G_{MID}$ and then the operation goes to step 909 to carry out failure judgment therein.

In the fifth embodiment, the knock detection and the failure detection are carried out at the same time, and in the knock detection, it is necessary to change the amplification factor of the amplifier in accordance with the cylinders under detection and the operating conditions. In this embodiment, since only one amplifier is used, it is necessary to carry out the failure detection by a signal with a suitably changed amplification factor (usually, a signal with a maximum amplification factor is used for the failure detection).

In this fifth embodiment, therefore, as described above, the process in the step 906 or 907 and the step 908 is carried out so that in the case where the engine rotational frequency or speed is not higher than a predetermined value $NE_{GAIN}$, correction is made always so as to obtain a result in which the failure detecting level is obtained from the output signal of the amplifier 5 amplified with the maximum amplification factor.

Figure 21A:
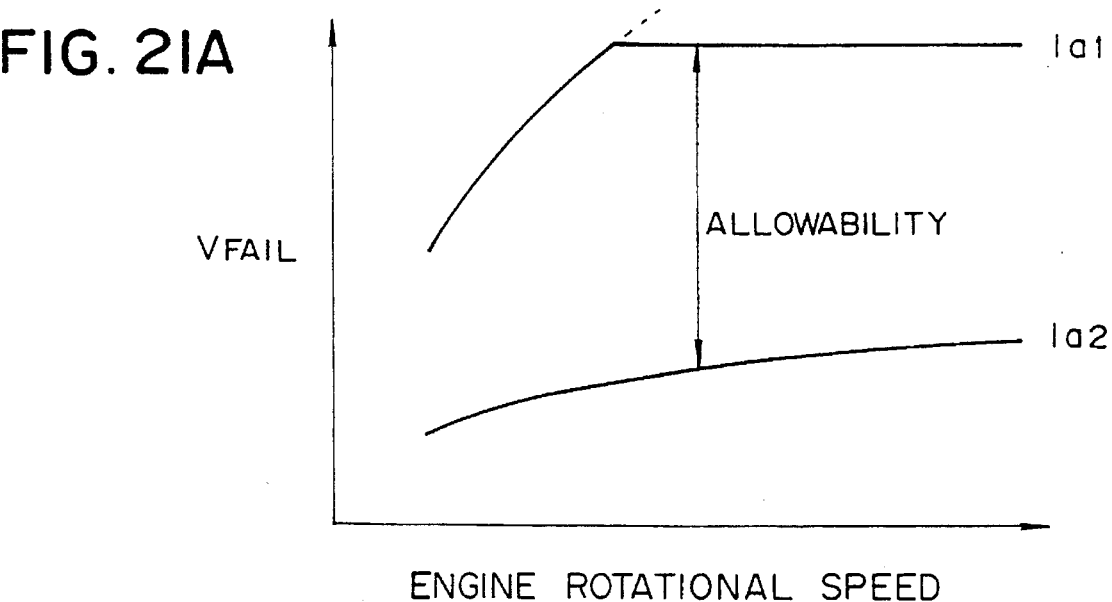
FIGS. 21A and 21B are characteristic diagrams showing the relation between the rotational frequency or speed of the engine and the failure judgment level in the fifth embodiment.
Figure 21B:
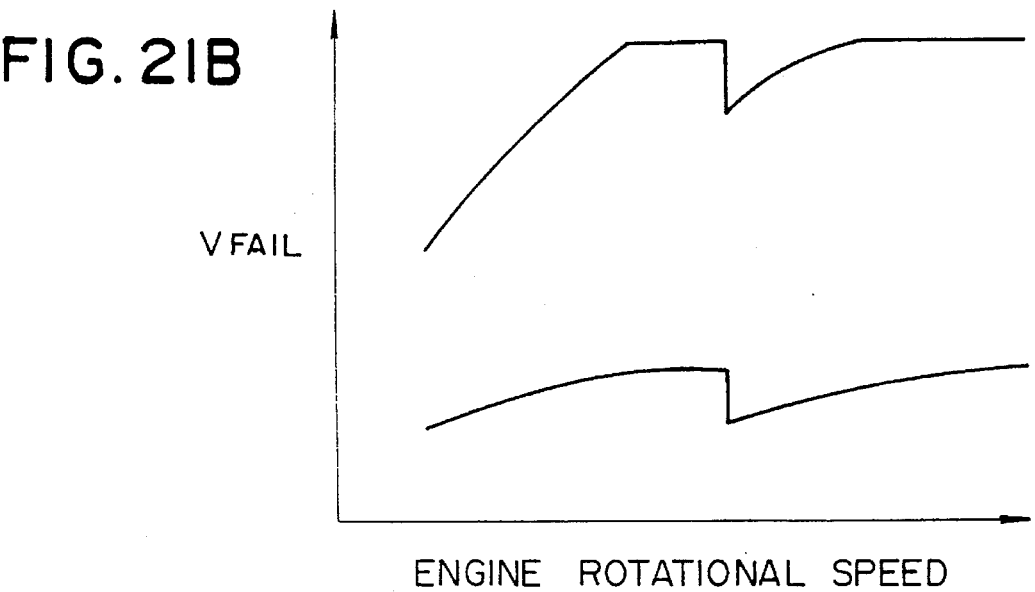

Further, in the case of high speed rotation of the engine in which the engine rotational frequency or speed is higher than the predetermined value $NE_{GAIN}$, correction is made with the amplification factor slightly smaller than the maximum amplification factor. This is because as follows. As shown in FIGS. 21A and 21B, in the case where the engine rotational frequency or speed is low, even if the failure detecting level $V_{FAIL}$ is formed by using the knock sensor output signal amplified with the maximum amplification factor, there is a sufficiently large difference between the value $I_{a1}$ of the failure detecting level $V_{FAIL}$ in the normal case and the value $I_{a2}$ of the failure detecting level $V_{FAIL}$ in the failure case (see FIG. 21A). In the case where the engine rotational frequency or speed is high, if the failure detecting level $V_{FAIL}$ is formed by using the knock sensor output signal amplified with the maximum amplification factor, the value of the failure detecting level $V_{FAIL}$ is apt to become large because the output signal of the knock sensor becomes large. Accordingly, as shown in FIG. 21A, the value $I_{a1}$ of the failure detecting level $V_{FAIL}$ in the normal case soon exceeds the allowable conversion range (dynamic range) of the A/D converter so that it cannot become larger than a certain value. On the other hand, the value $I_{a2}$ of the failure detecting level $V_{FAIL}$ in the failure case is also apt to become large so that it becomes larger than that in the case of low rotational frequency or speed of the engine and the difference between the value $I_{a1}$ of the failure detecting level $V_{FAIL}$ in the normal case and the value $I_{a2}$ of the failure detecting level $V_{FAIL}$ in the failure case becomes small. That is, the allowability necessary for prevention of misjudgment so as to judge an abnormal state to be a nominal one is reduced.

Accordingly, in the high rotational frequency or speed of the engine, correction is made correspondingly to the amplification factor $G_{MID}$ smaller than the maximum amplification factor $G_{MAX}$ so as to reduce the value $I_{b1}$ of the failure detecting level $V_{FAIL}$ in the normal case and the value $I_{b2}$ of the failure detecting level $V_{FAIL}$ in the failure case to thereby obtain such a character as shown in FIG. 21B to secure allowability for prevention of misjudgment.

Figure 22:
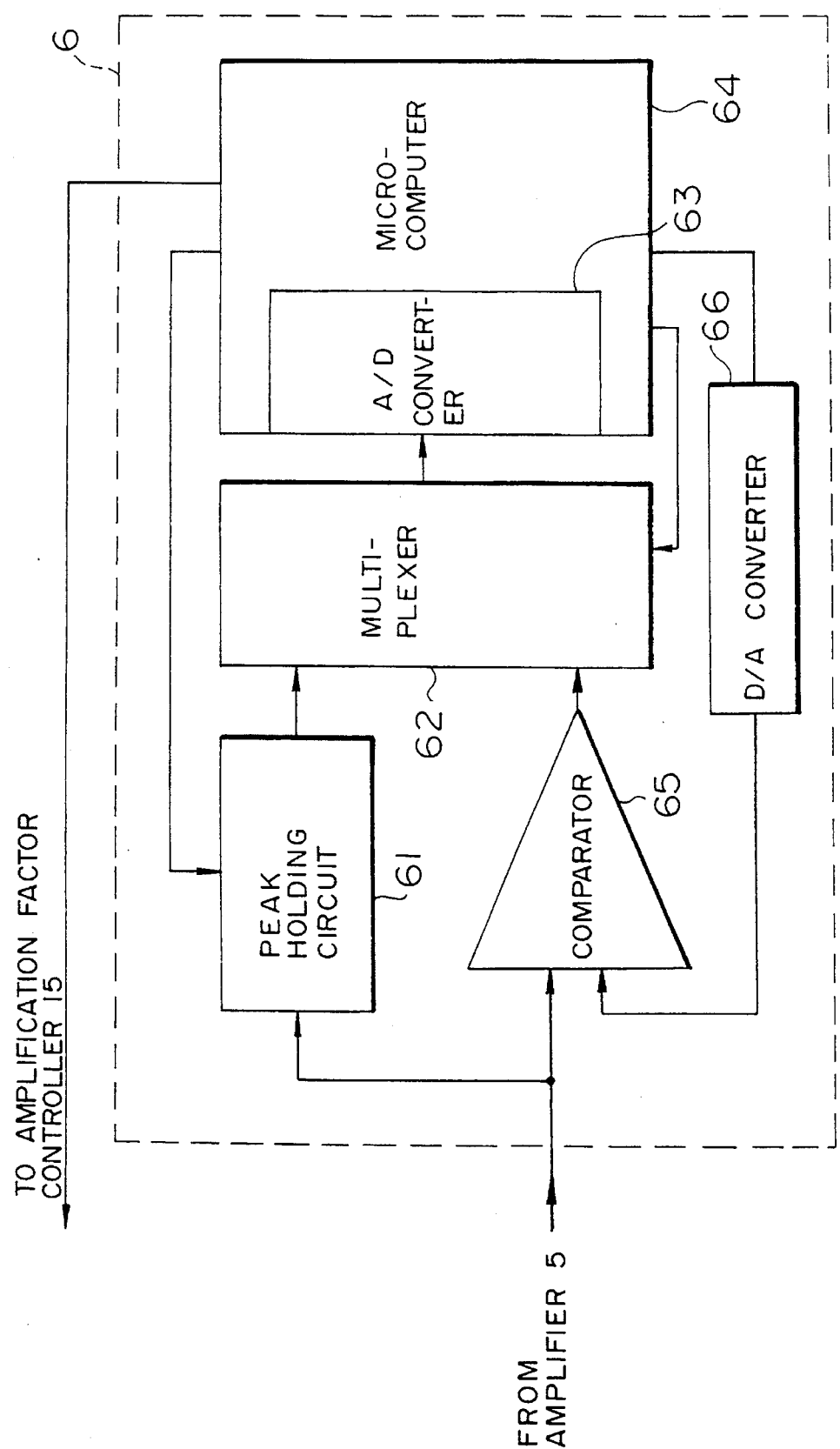
FIG. 22 is a block diagram showing the knock detecting circuit and failure detecting circuit in another embodiment.

In the above fifth embodiment, the process of the step 854 in FIG. 18 is carried out in the microcomputer 64. Alternatively, however, the process may be carried out by the provisions of a D/A converter 66 and a comparator 65 in the outside of the microcomputer 64 as shown in FIG. 22. That is, the comparator 65 compares the signal (the knock sensor output) from the amplifier 5 with the output value of the D/A converter 66 obtained by D/A converting the failure detecting level $V_{FAIL}$ supplied from the microcomputer 64 so that the comparator 65 outputs a signal when the knock sensor output is larger than the output signal of the D/A converter 66.

Figure 23:
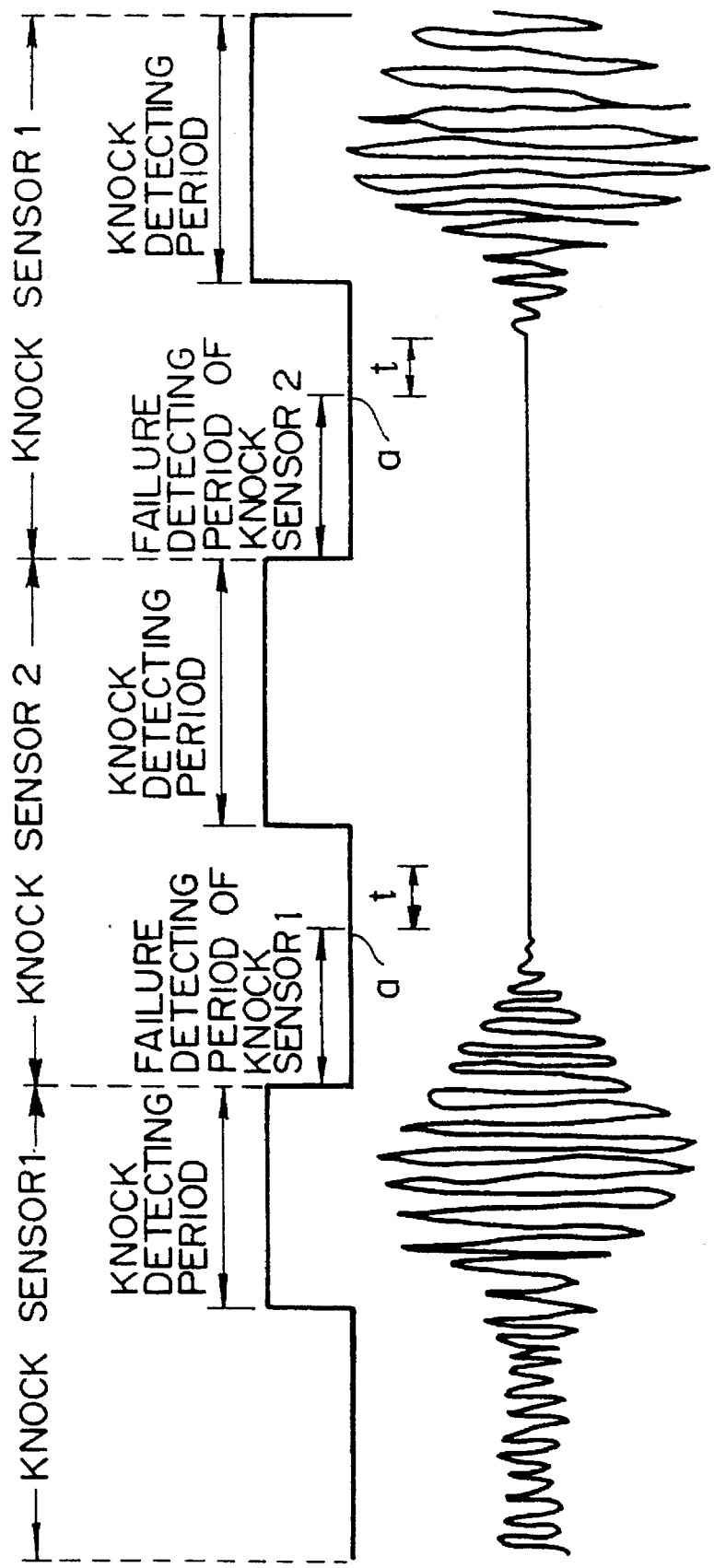
FIG. 23 is a time chart for explaining the other embodiment.

Further, in the above fifth embodiment, the failure detecting period and the knock detecting period are set to be the same period. Alternatively, however, the failure detection may be carried out after termination of the knock detecting period as shown in FIG. 23. In this case, the frequency switching of the switched capacitor filter and the knock sensor switching are carried out at the point a where the knock detecting period has terminated. Further, in the fifth embodiment, the failure detection signal is corrected in the step 907 so as to make the amplification factor be a value smaller than the maximum amplification factor when the engine rotational frequency or speed is high. This process is not always necessary and the process of the step 906 may be carried out regardless of the engine rotational frequency or speed.

As has been explained in detail, according to the present invention, a failure in a knock sensor signal system can be correctly detected, even when a changeover operation due to hardware is carried out on the input side of a band pass filter.

We claim:

1. A knock sensing apparatus for an internal combustion engine, comprising:

a plurality of knock sensors for detecting vibration which is generated in an internal combustion engine and generating output signals related thereto;

changeover means for selecting one of the output signals of the knock sensors;

a band pass filter for receiving an output signal of the changeover means, and outputting a signal having a predetermined frequency band peculiar to knocking;

knock detecting means for detecting an occurrence of knocking in the internal combustion engine on the basis of an output signal of the band pass filter;

failure detecting means for detecting a level of the output signal of the band pass filter and judging that a failure has occurred in a signal system of the knock sensors when the detected level is smaller than a predetermined value; and failure detection invalidating means for invalidating any detection of the failure by the failure detecting means for a predetermined period after the changeover means has performed a selecting operation.

2. A knock sensing apparatus for an internal combustion engine, comprising:

at least one knock sensor for detecting vibration which is generated in an internal combustion engine and generating an output signal related thereto;

at least one band pass filter for receiving the output signal of the knock sensor, and outputting a signal having a predetermined frequency band peculiar to knocking, said band pass filter having a plurality of changeable frequency characteristics;

changeover means for selecting one of the frequency characteristics of the band pass filter;

knock detecting means for detecting an occurrence of knocking in the internal combustion engine on the basis of an output signal of the band pass filter;

failure detecting means for detecting a level of the output signal of the band pass filter and judging that a failure has occurred in a signal system of the knock sensor when the detected level is smaller than a predetermined value; and failure detection invalidating means for invalidating any detection of the failure by the failure detecting means for a predetermined period after the changeover means has performed a selecting operation.

3. A knock sensing apparatus for an internal combustion engine according to claim 2, wherein the changeover means selects one of the frequency characteristics of the band pass filter in accordance with a running state of the internal combustion engine, and the selecting operation is performed under a processing condition having a hysteresis characteristic.

4. A knock sensing apparatus for an internal combustion engine according to claim 2, wherein the band pass filter includes a switched capacitor filter having a plurality of changeable frequency characteristics, and the changeover means includes filter control means for changing a frequency of a switching drive signal, which is applied to the switched capacitor filter, in accordance with a running state of the internal combustion engine so as to select one of the frequency characteristics of the switched capacitor filter.

5. A knock sensing apparatus for an internal combustion engine according to claim 4, wherein the filter control means changes the frequency of the switching drive signal under a processing condition having a hysteresis characteristic.

6. A knock sensing apparatus for an internal combustion engine, comprising:

at least one knock sensor for detecting vibration which is generated in an internal combustion engine and generating an output signal related thereto;

at least one band pass filter for receiving an output signal of the knock sensor, and outputting a signal having a predetermined frequency band peculiar to knocking;

changeover means for performing a changeover operation, said changeover means including hardware disposed between the knock sensor and the band pass filter;

knock detecting means for detecting an occurrence of knocking in the internal combustion engine on the basis of an output signal of the band pass filter;

failure detecting means for detecting a level of the output signal of the band pass filter and judging that a failure has occurred in a signal system of the knock sensor when the detected level is smaller than a predetermined value; and failure detection invalidating means for invalidating any detection of the failure by the failure detecting means for a predetermined period after the changeover means has performed the changeover operation.

7. A knock sensing apparatus for an internal combustion engine, comprising:

at least one knock sensor for detecting vibration which is generated in an internal combustion engine and generating an output signal related thereto;

at least one band pass filter for receiving an output signal of the knock sensor, and outputting a signal having a predetermined frequency band peculiar to knocking;

changeover means for selecting one of the output signal of the knock sensor and an output signal of the band pass filter in accordance with a crank angle of the internal combustion engine;

knock detecting means for detecting an occurrence of knocking in the internal combustion engine on the basis of an output signal of the band pass filter in a case where the changeover means selects the output signal of the band pass filter; and failure detecting means for detecting a level of the output signal of the knock sensor and judging that failure has occurred in a signal system of the knock sensor when the detected level is smaller than a predetermined value in a case where the changeover means selects the output signal of the knock sensor.

8. A knock sensing apparatus for an internal combustion engine according to claim 1, further comprising:

voltage conversion means for converting a supply voltage into a desired voltage by using a resistor matrix;

an A–D converter for converting an output voltage of the voltage conversion means into digital data;

parameter changing means for changing at least one of said predetermined value and a knock detecting value in accordance with the digital data, wherein said knock detecting value is compared with the level of the output signal of the band pass filter by the knock detecting means in order to detect the occurrence of knocking;

engine rotational frequency judging means for judging whether or not a rotational frequency of the internal combustion engine is greater than a predetermined rotational frequency; and parameter change inhibiting means for inhibiting the parameter changing means from performing a changing operation when the engine rotational frequency judging means judges that the rotational frequency of the internal combustion engine is greater than the predetermined rotational frequency.

9. A knock sensing apparatus for an internal combustion engine according to claim 2, further comprising:

voltage conversion means for converting a supply voltage into a desired voltage by using a resistor matrix;

an A–D converter for converting an output voltage of the voltage conversion means into digital data;

parameter changing means for changing at least one of said predetermined value and a knock detecting value in accordance with the digital data, wherein said knock detecting value is compared with the level of the output signal of the band pass filter by the knock detecting means in order to detect the occurrence of knocking;

engine rotational frequency judging means for judging whether or not a rotational frequency of the internal combustion engine is greater than a predetermined rotational frequency; and parameter change inhibiting means for inhibiting the parameter changing means from performing a changing operation when the engine rotational frequency judging means judges that the rotational frequency of the internal combustion engine is greater than the predetermined rotational frequency.

10. A knock sensing apparatus for an internal combustion engine according to claim 6, further comprising:

voltage conversion means for converting a supply voltage into a desired voltage by using a resistor matrix;

an A–D converter for converting an output voltage of the voltage conversion means into digital data;

parameter changing means for changing at least one of said predetermined value and a knock detecting value in accordance with the digital data, wherein said knock detecting value is compared with the level of the output signal of the band pass filter by the knock detecting means in order to detect the occurrence of knocking;

engine rotational frequency judging means for judging whether or not a rotational frequency of the internal combustion engine is greater than a predetermined rotational frequency; and parameter change inhibiting means for inhibiting the parameter changing means from performing a changing operation when the engine rotational frequency judging means judges that the rotational frequency of the internal combustion engine is greater than the predetermined rotational frequency.

11. A knock sensing apparatus for an internal combustion engine according to claim 7, further comprising:

voltage conversion means for converting a supply voltage into a desired voltage by using a resistor matrix;

an A–D converter for converting an output voltage of the voltage conversion means into digital data;

parameter changing means for changing at least one of said predetermined value and a knock detecting value in accordance with the digital data, wherein said knock detecting value is compared with the level of the output signal of the band pass filter by the knock detecting means in order to detect the occurrence of knocking;

engine rotational frequency judging means for judging whether or not a rotational frequency of the internal combustion engine is greater than a predetermined rotational frequency; and parameter change inhibiting means for inhibiting the parameter changing means from performing a changing operation when the engine rotational frequency judging means judges that the rotational frequency of the internal combustion engine is greater than the predetermined rotational frequency.

12. A knock sensing apparatus for an internal combustion engine, comprising:

a knock sensor for detecting vibration which is generated in the internal combustion engine and generating an output signal related thereto;

a band pass filter for receiving an output signal of the knock sensor, and outputting a signal having a predetermined frequency band peculiar to knocking;

changeover means for performing a changeover operation, said changeover means including hardware disposed between the band pass filter and the knock sensor;

knock detecting means for detecting an occurrence of knocking in the internal combustion engine on the basis of an output signal of the band pass filter;

failure detecting means for detecting a level of the output signal of the band pass filter and judging that failure has occurred in a signal system of the knock sensor when the detected level is smaller than a predetermined value; and changeover performing means for causing the changeover means to perform the changeover operation after failure detection is performed by the failure detecting means.

13. A knock sensing apparatus for an internal combustion engine according to claim 12, wherein the knock detecting means and the failure detecting means are performed in the same period.

14. A knock sensing apparatus for an internal combustion engine according to claim 13, wherein:

the apparatus further comprises amplifying means for amplifying the output signal of the band pass filter with an optimum amplification factor selected from a plurality of amplification factors before application of the output signal of the band pass filter to the knock detecting means and the failure detecting means; and the failure detecting means includes means for performing failure detection after correcting the output signal of the band pass filter so as to correspond to a value amplified with a predetermined amplification factor.

15. A knock sensing apparatus for an internal combustion engine according to claim 14, wherein the predetermined amplification factor is a maximum amplification factor.

16. A knock sensing apparatus for an internal combustion engine according to claim 14, wherein:

the apparatus further comprises a rotational speed detecting means for detecting a rotational speed of the internal combustion engine; and the failure detecting means includes means for correcting the output signal of the band pass filter so as to correspond to a value amplified with a maximum amplification factor when the rotational speed detected by the rotational speed detecting means is lower than a predetermined rotational speed, and for correcting the output signal of the band pass filter so as to correspond to a value amplified with a predetermined amplification factor which is smaller than the maximum amplification factor when the rotational speed detected by the rotational speed detecting means is not lower than the predetermined rotational speed.

17. A knock sensing apparatus for an internal combustion engine, comprising:

a plurality of knock sensors for detecting vibration which is generated in the internal combustion engine and generating output signals related thereto;

changeover means for selecting one of the output signals of the knock sensors;

a band pass filter for receiving the one of the output signals of the knock sensors selected by the changeover means and outputting a signal having a predetermined frequency band peculiar to knocking;

knock detecting means for detecting an occurrence of knocking in the internal combustion engine on the basis of an output signal of the band pass filter;

failure detecting means for detecting a level of the output signal of the band pass filter and judging that failure has occurred in a signal system of the knock sensors when the detected level is smaller than a predetermined value; and changeover performing means for causing the changeover means to perform the changeover operation after failure detection is performed by the failure detecting means.

18. A knock sensing apparatus for an internal combustion engine according to claim 17, wherein the knock detecting means and the failure detecting means are performed in the same period.

19. A knock sensing apparatus for an internal combustion engine according to claim 18, wherein:

the apparatus further comprises amplifying means for amplifying the output signal of the band pass filter with an optimum amplification factor selected from a plurality of amplification factors before application of the output signal of the band pass filter to the knock detecting means and the failure detecting means; and the failure detecting means includes means for performing failure detection after correcting the output signal of the band pass filter so as to correspond to a value amplified with a predetermined amplification factor.

20. A knock sensing apparatus for an internal combustion engine according to claim 19, wherein the predetermined amplification factor is a maximum amplification factor.

21. A knock sensing apparatus for an internal combustion engine according to claim 19, wherein:

the apparatus further comprises a rotational speed detecting means for detecting a rotational speed of the internal combustion engine; and the failure detecting means includes means for correcting the output signal of the band pass filter so as to correspond to a value amplified with a maximum amplification factor when the rotational speed detected by the rotational speed detecting means is lower than a predetermined rotational speed, and for correcting the output signal of the band pass filter so as to correspond to a value amplified with a predetermined amplification factor which is smaller than the maximum amplification factor when the rotational speed detected by the rotational speed detecting means is not lower than the predetermined rotational speed.

22. A knock sensing apparatus for an internal combustion engine, comprising:

at least one knock sensor for detecting vibration which is generated in the internal combustion engine and generating an output signal related thereto;

at least one band pass filter for receiving an output signal of the knock sensor, and outputting a signal having a predetermined frequency band peculiar to knocking, said band pass filter having a plurality of changeable frequency characteristics;

changeover means for selecting one of the frequency characteristics of the band pass filter;

knock detecting means for detecting an occurrence of knocking in the internal combustion engine on the basis of an output signal of the band pass filter;

failure detecting means for detecting a level of the output signal of the band pass filter and judging that failure has occurred in a signal system of the knock sensor when the detected level is smaller than a predetermined value; and changeover performing means for causing the changeover means to perform the changeover operation after failure detection is performed by the failure detecting means.

23. A knock sensing apparatus for an internal combustion engine according to claim 22, wherein the knock detecting means and the failure detecting means are performed in the same period.

24. A knock sensing apparatus for an internal combustion engine according to claim 23, wherein:

the apparatus further comprises amplifying means for amplifying the output signal of the band pass filter with an optimum amplification factor selected from a plurality of amplification factors before application of the output signal of the band pass filter to the knock detecting means and the failure detecting means; and the failure detecting means includes means for performing failure detection after correcting the output signal of the band pass filter so as to correspond to a value amplified with a predetermined amplification factor.

25. A knock sensing apparatus for an internal combustion engine according to claim 24, wherein the predetermined amplification factor is a maximum amplification factor.

26. A knock sensing apparatus for an internal combustion engine according to claim 24, wherein:

the apparatus further comprises a rotational speed detecting means for detecting a rotational speed of the internal combustion engine; and the failure detecting means includes means for correcting the output signal of the band pass filter so as to correspond to a value amplified with a maximum amplification factor when the rotational speed detected by the rotational speed detecting means is lower than a predetermined rotational speed, and for correcting the output signal of the band pass filter so as to correspond to a value amplified with a predetermined amplification factor which is smaller than the maximum amplification factor when the rotational speed detected by the rotational speed detecting means is not lower than the predetermined rotational speed.

27. A knock sensing apparatus for an internal combustion engine, comprising:

a knock sensor for detecting vibration which is generated in the internal combustion engine and generating an output signal related thereto;

a band pass filter for receiving an output signal of the knock sensor, and outputting a signal having a predetermined frequency band peculiar to knocking;

changeover means for performing changeover operation, said changeover means including hardware disposed between the knock sensor and the band pass filter;

knock detecting means for detecting an occurrence of knocking in the internal combustion engine on the basis of an output signal of the band pass filter; and failure detecting means for detecting a level of the output signal of the band pass filter and judging that failure has occurred in a signal system of the knock sensor when the detected level is smaller than a predetermined value;

wherein the knock detecting means and the failure detecting means perform knock detection and failure detection, respectively, in the same period before the changeover operation.

28. A knock sensing apparatus for an internal combustion engine according to claim 27, wherein:

the apparatus further comprises amplifying means for amplifying the output signal of the band pass filter with an optimum amplification factor selected from a plurality of amplification factors before application of the output signal of the band pass filter to the knock detecting means and the failure detecting means; and the failure detecting means includes means for performing failure detection after correcting the output signal of the band pass filter so as to correspond to a value amplified with a predetermined amplification factor.

29. A knock sensing apparatus for an internal combustion engine according to claim 28, wherein the predetermined amplification factor is a maximum amplification factor.

30. A knock sensing apparatus for an internal combustion engine according to claim 28, wherein:

the apparatus further comprises a rotational speed detecting means for detecting a rotational speed of the internal combustion engine; and the failure detecting means includes means for correcting the output signal of the band pass filter so as to correspond to a value amplified with a maximum amplification factor when the rotational speed detected by the rotational speed detecting means is lower than a predetermined rotational speed, and for correcting the output signal of the band pass filter so as to correspond to a value amplified with a predetermined amplification factor which is smaller than the maximum amplification factor when the rotational speed detected by the rotational speed detecting means is not lower than the predetermined rotational speed.

* * * * *